(12) United States Patent
Rijckaert

(10) Patent No.: US 6,317,556 B1
(45) Date of Patent: Nov. 13, 2001

(54) SYNC BLOCK NUMBERING OF TRICK PLAY SIGNALS DURING RECORDING OF SUCH SIGNALS ON A RECORD CARRIER

(75) Inventor: Albert M. A. Rijckaert, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/155,682

(22) PCT Filed: Feb. 2, 1998

(86) PCT No.: PCT/IB98/00130

§ 371 Date: Oct. 2, 1998

§ 102(e) Date: Oct. 2, 1998

(87) PCT Pub. No.: WO98/34225

PCT Pub. Date: Aug. 6, 1998

(30) Foreign Application Priority Data

Feb. 3, 1997 (EP) .................................................. 97200278
Feb. 13, 1997 (EP) .................................................. 97200402

(51) Int. Cl.$^7$ .................................................. H04N 5/91
(52) U.S. Cl. .................................................. 386/68; 386/81
(58) Field of Search ............................... 386/6–8, 40, 68, 386/69, 74, 81, 124

(56) References Cited

U.S. PATENT DOCUMENTS

| | | | | |
|---|---|---|---|---|
| 5,684,915 | * | 11/1997 | Ueda et al. | 386/124 |
| 5,978,542 | * | 11/1999 | Ting et al. | 386/68 |
| 5,991,501 | * | 11/1999 | Higurashi et al. | 386/98 |
| 6,085,022 | * | 7/2000 | Ueda et al. | 386/68 |
| 6,097,877 | * | 8/2000 | Katayama et al. | 386/68 |
| 6,108,148 | * | 8/2000 | Higurashi et al. | 386/68 |
| 6,115,532 | * | 9/2000 | Saeki | 386/68 |
| 6,118,922 | * | 9/2000 | Van Gestel et al. | 386/68 |
| 6,141,485 | * | 10/2000 | Shinohara et al. | 386/68 |
| 6,141,486 | * | 10/2000 | Lane et al. | 386/68 |
| 6,201,926 | * | 3/2001 | Yoshida et al. | 386/68 |

* cited by examiner

Primary Examiner—Wendy R. Garber
Assistant Examiner—Polin Chieu
(74) Attorney, Agent, or Firm—Edward W. Goodman

(57) ABSTRACT

A specific sync block numbering is provided for the sync blocks of a trick play signal recorded on a record carrier. This trick play signal is meant for reproduction at a trick play record carrier speed other than the nominal recording speed.

48 Claims, 17 Drawing Sheets

SYNC BLOCK NUMBERING OF TRICK PLAY SIGNALS DURING RECORDING OF SUCH SIGNALS ON A RECORD CARRIER

BACKGROUND OF THE INVENTION

1. Field of the Invention

The invention relates to an apparatus for recording a first and a second digital information signal in slant tracks on a magnetic record carrier, the apparatus comprising input means for receiving the first and second digital information signal, signal processing means for processing the first and second digital signal into first and second trick play signals, respectively, suitable for recording in the tracks, writing, means for writing at a recording speed of the record carrier, the first and second trick play signals so as to obtain first and second trick play segments, respectively, located at specific positions in said tracks, the writing means comprising at least a first and a second write head located on a rotatable head drum, the first head having a gap with a first azimuth angle and the second head having a gap with a second azimuth angle which is different from the first azimuth angle, the first digital information signal being meant for enabling a replay in a reproduction apparatus at a trick play reproduction speed which equals $n_1$ times the recording speed, the second digital information signal being meant for enabling a replay in said reproduction apparatus at a trick play reproduction speed which equals $n_2$ times the recording speed, where $n_1$ and $n_2$ are integers unequal to each other and unequal to 0 and 1.

2. Description of the Related Art

Such a recording apparatus is known from WO 95/28,061, corresponding to U.S. Pat. No. 5,751,889. document D4 in the list of related documents. The known apparatus takes the form of a digital video recorder for recording a digital video signal. The digital video signal may be in the form of an MPEG encoded video signal, in which packets of information of the digital video signal are included in the serial data stream of the MPEG encoded video signal. In addition to such MPEG encoded video signal, a trick play signal can be recorded in the tracks on the record carrier. Such trick play signal can be the same video signal, but reproduced at a record carrier (trick play) speed which is other than the nominal reproduction speed. Generally, a separate datastream is recorded on the record carrier for enabling the reproduction at such trick play speed. The trick play signal can be derived from the MPEG encoded video signal, e.g., by selecting I-frames from the MPEG encoded video signal.

This trick play signal, however, need not necessarily be a trick play signal that has a relationship with the MPEG-encoded video signal, but can be a completely different signal. But, in the same way as the MPEG-encoded digital video signal, the serial datastream of the trick play signal comprises packets of information of the trick play signal.

The document mentioned above describes the recording of segments of information of a plurality of trick play signals in the tracks on a record carrier. The segments of a specific trick play signal have a specific position in the tracks in order to enable reproduction of the trick play signal at its corresponding trick play reproduction speed.

SUMMARY OF THE INVENTION

It is an object of the invention to provide an improved recording apparatus for recording a plurality of trick play signals in accordance with a specific format on the record carrier.

The recording apparatus in accordance with the invention is characterized in that the first and second trick play signals comprise sync blocks of information of the first and second digital information signals, respectively, and that the writing means are adapted to write the sync blocks of the first trick play signal into a plurality of the first trick play segments and to write the sync blocks of the second trick play signal into a plurality of the second trick play segments, the sync blocks in the trick play segments comprising a first and a second sync block sequence number, the first sync block sequence number in a sync block having a relationship with the position of the sync block in a track, and the second sync block sequence number having no such relationship with the position of the sync block in said track.

The invention is based on the recognition that a specific sync block numbering of the sync blocks in the trick play segments is required. An important feature in this respect is that the trick play signals can comprise (so defined 'original') sync blocks having information of the trick play signal stored in them. The number of 'original' sync blocks read during one revolution of the head drum in a trick play reproduction mode is generally less than $m_1$. Those sync blocks are numbered from a certain start count value $m_0$, which is preferably zero, up to a first count value. Other sync blocks in the trick play segments can be in the form of sync blocks comprising parity information or sync blocks being repetitions of 'original' sync blocks. Those sync blocks are numbered as well, with the specific feature that the sync blocks comprising parity information and read during the said one revolution have sync block numbers starting with said first count value up to a final count value which is equal to $m_0+m_1-1$. In the situation where repetitions are present, an 'original' sync block and its repetition have the same sync block number.

The numbering of the parity sync blocks enables a later (different) choice to be made for the error correction encoding carried out on the trick play signal in question upon recording. Another error correction encoding will lead to more or less sync blocks comprising parity information to be stored on the record carrier. As the sync blocks of parity information have sync block numbers that run from the first count value and up, the parity sync blocks do not interfere with the 'original' sync blocks, so that a reproduction on the basis of the original sync blocks only is still possible, even in a reproduction apparatus having another error correction decoding than originally defined.

Further, the sync block numbers for the trick play sync blocks are in addition to 'normal' sync block numbers that identify the position of the sync blocks in a track on the record carrier. The presently defined sync block numbers are not related to such positions, so that there is a freedom of storing the sync blocks are other positions in the record carrier, without interfering with the trick play reproduction in question.

BRIEF DESCRIPTION OF THE DRAWINGS

These and other aspects of the invention will be apparent from and elucidated with reference to the embodiments described hereafter in the drawings, in which.

DESCRIPTION OF THE PREFERRED EMBODIMENTS

Figure 1:
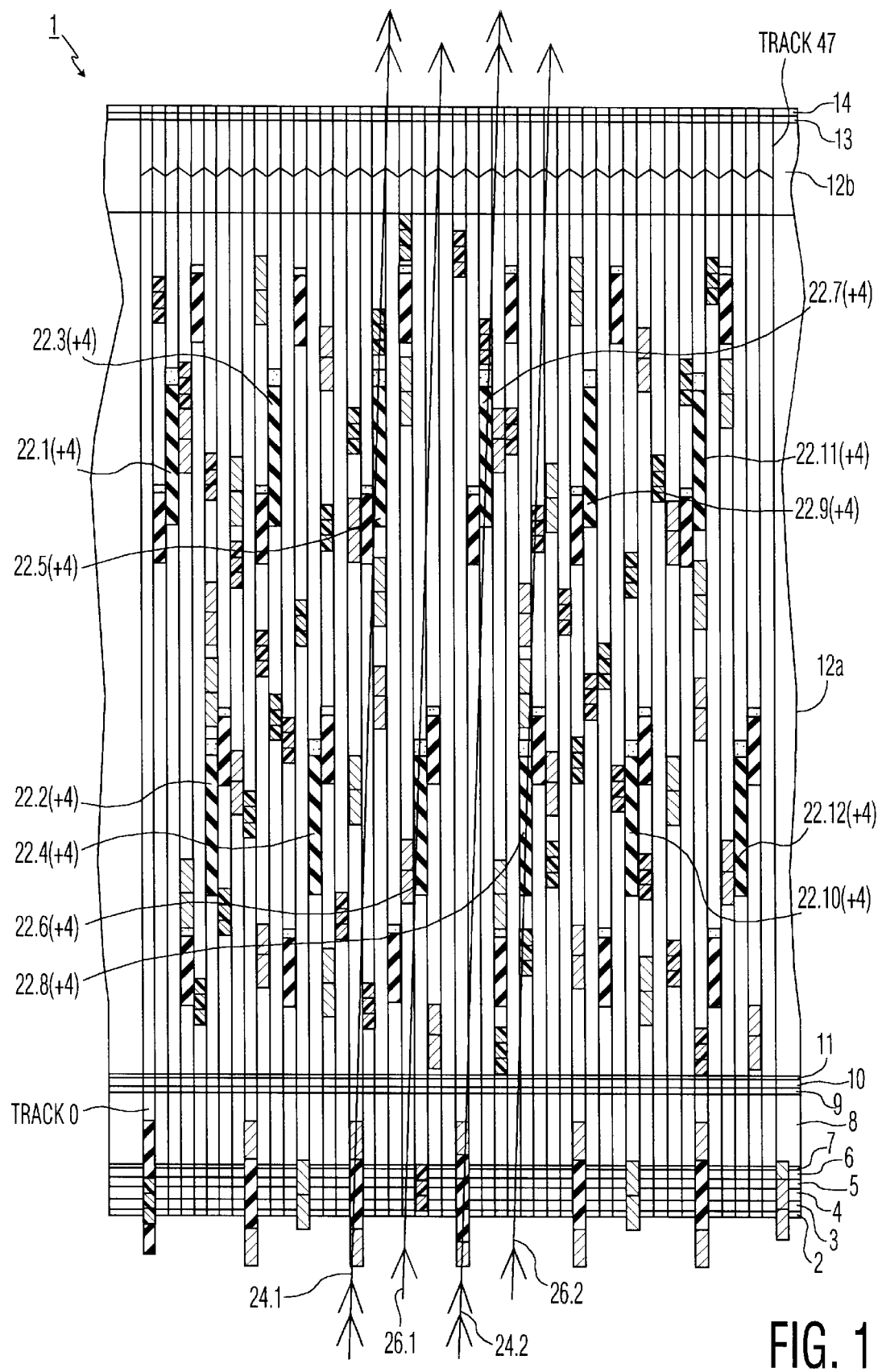
FIG. 1 shows the track format in a group of p tracks, where p equals 48, and the paths across the record carrier that two reproduction heads follow during a first trick play reproduction mode, where the record carrier speed is +4 times nominal.

FIG. 1 shows the track format of the tracks recorded on the record carrier 1. The tracks are recorded at a slant angle with reference to the longitudinal direction of the record carrier. In FIG. 1, however, the tracks are shown, for clarity reasons, at an angle transverse to the longitudinal direction of the record carrier 1. Groups of p successive tracks can be identified on the record carrier 1. One such group of p successive tracks is shown in FIG. 1, where p is in the present example equal to 48. During recording/reproduction, the tracks are written/read in a direction from the bottom to the top of FIG. 1 and from left to right in the figure.

Having subsequent groups of 48 tracks, the following dividends are possible as trick play speeds: 2×, 3×, 4×, 6×, 8×, 12× and 24×. The lowest two trick play speeds require a large amount of trick play data. Further, it is preferred to select trick play speeds that are integer multiples of each other. That results in either the trick play speeds 4×, 12× and 24×, or 6×, 12 and 24×. In the following, the set of trick play speeds 4×, 12× and 24×, and their reverse speeds will be further discussed.

Figure 2:
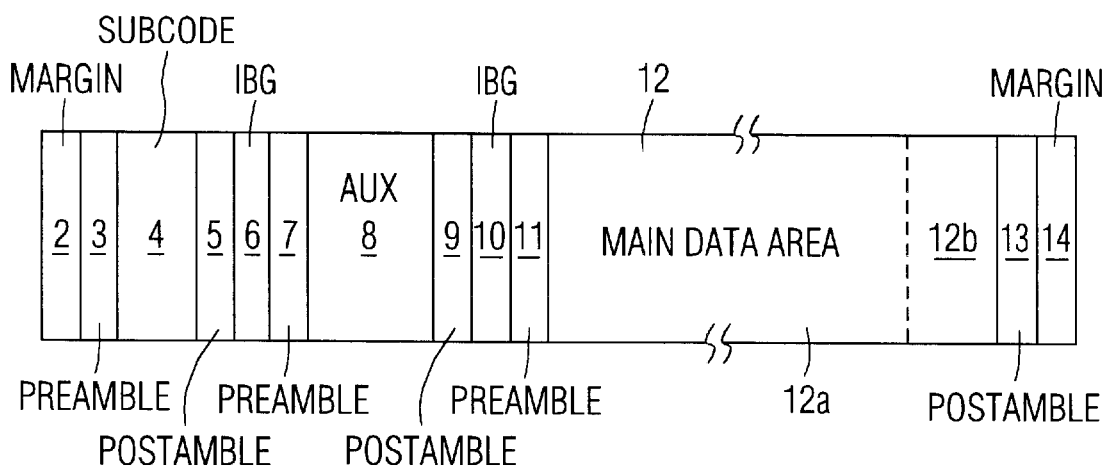
FIG. 2 shows the contents of a track on the record carrier.

FIG. 2 shows the format of one track. The track is recorded and read in a direction from left to right in the figure. In the present example, the lengths of the various track portions in FIG. 2 are expressed in a number of main sync blocks, where a main sync block has a length of 112 bytes of 8 bits each.

First, a clock run-in portion 2, denoted 'margin', is recorded, which in the present example, is 2 main sync blocks long. Next, a preamble portion 3 follows, which is 3 main sync blocks long. A subcode signal recording portion 4 follows the preamble portion 3 and is 4 main sync blocks long. The subcode signal recording portion 4 has a subcode signal recorded in it. The subcode signal can comprise, among others, absolute and/or relative time information and a table of contents.

Next, a postamble portion 5 follows, which is 3 main sync blocks long, an edit gap 6, denoted 'IBG', which is 3 main sync blocks long and a preamble portion 7, which is, in the present example 1 main sync block long. Next, an auxiliary signal recording portion 8, denoted 'AUX', follows which is 23 main sync blocks long. The aux signal recording portion 8 is meant for recording an auxiliary signal, such as text data, as an example. This aux signal recording portion 8 is followed by a postamble portion 9, which is 2 main sync blocks long, an edit gap 10, denoted 'IBG', which is 3 main sync blocks long, and a preamble portion 11, which is 1 main sync block long. Next, an information signal recording portion 12, denoted 'main data area', follows which is 307 main sync blocks long. The information signal recording portion 12 is meant to receive the digital information signals. One digital information signal can be a digital video signal and/or a digital audio signal, which may have been encoded into an MPEG information signal. Further, trick play data can be included in the information signal recording portion 12. The information signal recording portion 12 is fictively divided into two parts, a first part 12a, which is 277 main sync blocks long, and a second part 12b, which is 30 main sync blocks long. The second part 12b comprises outer ECC parity information.

The information signal recording portion 12 is followed by a postamble portion 13, which is 2 main sync blocks long, and another 'margin' portion 14, the length of which is not relevant, but can be assumed to be 2 main sync blocks long, for the present example. In total, the track thus comprises 356 main sync blocks.

It should be noted here, that the auxiliary signal recording portion 8 may be optional, in the sense that in another recording mode, no auxiliary signal is recorded in the tracks and the recording portion 8, including the portions 9, 10 and 11, are added to the information signal recording portion 12 and are filled with main information, however, without any trick play data.

Coming back to FIG. 1, the contents of the first part 12a of the information signal recording portion 12 will be further described. FIG. 1 shows tracks that have been recorded using at least a first and a second write head. The first head has a gap with a first azimuth angle and the second head has a gap with a second azimuth angle, which is different from the first azimuth angle. The tracks recorded by the first write head are indicated by the slant line running from the bottom left corner of the figure to the top right corner of the figure, and the tracks recorded by the second write head are indicated by the slant line running from the bottom right corner of the figure to the top left corner of the figure, see the circle in FIG. 1 having the reference numeral 20.

The first information signal, which may comprise packets of information of an MPEG transport stream, are recorded in the tracks, more specifically, in the information signal recording portions 12 of the tracks. In an embodiment of the recording apparatus, which is in the form of a digital videorecorder of the helical scan type, the first information signal could be 'normal play' data recorded in the tracks for reproduction in a reproducing apparatus at a record carrier speed which is the same as the record carrier speed during recording. This speed is defined as the nominal record carrier speed. The first information signal is accommodated in the main sync blocks, defined above.

Further, a second information signal has been recorded in specific segments in the tracks. Those segments are indicated in FIG. 1 by reference numerals 22.i(+4), where i runs from 1 to 12. This second information signal is meant for a reproduction in a reproduction apparatus at a reproduction speed which is 4 times the nominal reproduction speed in the forward direction. This second information signal could be an information signal which has no relationship whatsoever with the first information signal introduced above. Alternatively, the second information signal could have a relationship with the first information signal, in the sense that the second information signal is a trick play signal for the 4 times nominal reproduction speed, in order to obtain a reproduced (video) signal, which is a replica of the reproduced first (video) signal, but reproduced at four times the nominal speed in the forward direction.

Figure 1A:
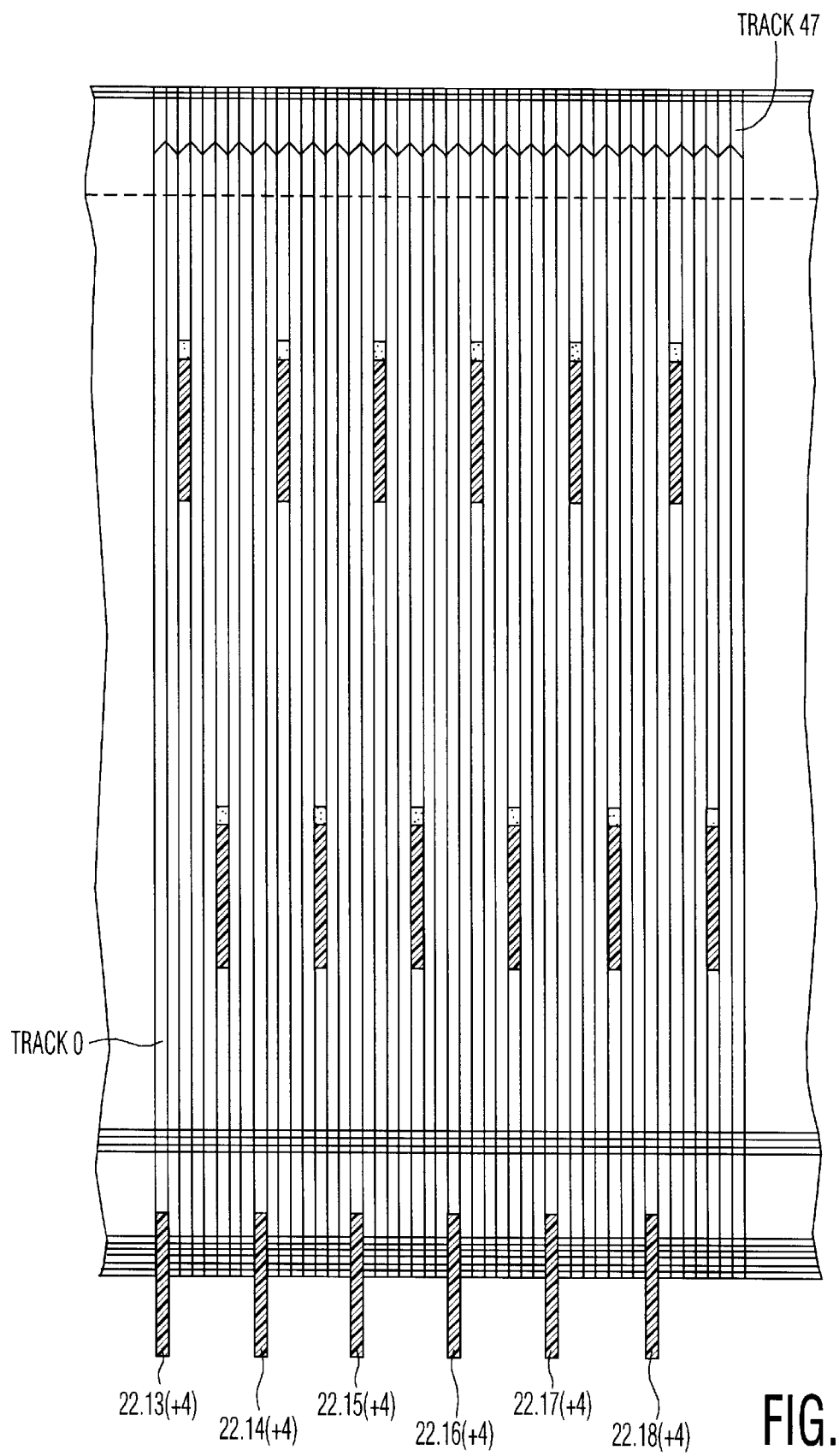
FIG. 1a shows the trick play segments for the +4 times nominal reproduction mode only, in the group of 48 tracks.

FIG. 1a shows the same group of 48 tracks as FIG. 1, however, only the 12 segments 22.i(+4) are shown in FIG. 1a. Assuming the track number of the first track in the group of 48 tracks to be track no. 0, and the track number of the last track in the group to be track number 47, the segments are recorded in the tracks with track number 2+n.8 and 5+n.8, where n is an integer running from 0 to 5 inclusive.

FIG. 1 further shows four scanning lines 24.1, 24.2, 26.1 and 26.2. The double arrowed scanning lines 24.1 and 24.2 show the paths that the one head, having the first azimuth angle, follow across the record carrier in the four times nominal reproduction mode, during two revolutions of the head drum. The single arrowed scanning lines 26.1 and 26.2 show the paths that the other head, having the second azimuth angle, follow across the record carrier in the four times nominal reproduction mode during the said two revolutions of the head drum. As can be seen in FIG. 1, the one head reads the trick play segments 22.i(+4), where i is odd, and the other head thus reads the trick play segments 22.i(+4), where i is even.

The trick play segments 22.i(+4) each have a length of $(m_1/2=)$ 50 main sync blocks, in the present example. From the 50 main sync blocks in one segment, 45 sync blocks have information contents as regards the trick play information stored in those sync blocks, which could include 'dummy' sync blocks, to be described later. The other five sync blocks in a segment comprise parity information, obtained from an ECC encoding step carried out on the trick play information. Thus, during each revolution of the head drum, during a four times nominal reproduction mode, 100 sync blocks of information of the second information signal, which include 10 sync blocks comprising parity information, are read from the record carrier.

When numbering the main sync blocks in a track, starting from 0, which is the first sync block in the aux recording area 8 in the track, until 305, which is the last sync block in the area 12a of the track, the sync blocks in the segments 22.i(+4), where i is even, are the sync blocks numbered 87 to 136 inclusive in a track, where the sync blocks numbered 132 to 136 inclusive are the sync blocks comprising the parity information. Further, the sync blocks in the segments 22.i(+4), where i is odd, are the sync blocks numbered 206 to 255 inclusive in a track, where, again, the sync blocks numbered 251 to 255 inclusive are the sync blocks comprising the parity information. It should be noted here, that what is called here as 'sync block numbers' for the trick play sync blocks, those numbers are numbers different from what is later called and described as 'trick play sync block numbers' for the same trick play sync blocks.

FIG. 1a further shows portions, numbered 22.13(+4) to 22.18(+4), located at the lower edge of some of the tracks in the group of 48 tracks. Those locations are locations that can be read in the +4 times nominal reproduction mode by one of the two heads, in the present case, the head having the first azimuth. As the locations shown include the subcode signal recording portion, it is possible to read the information in the subcode signal recording portion, also in the +4 times nominal reproduction mode.

Figure 3:
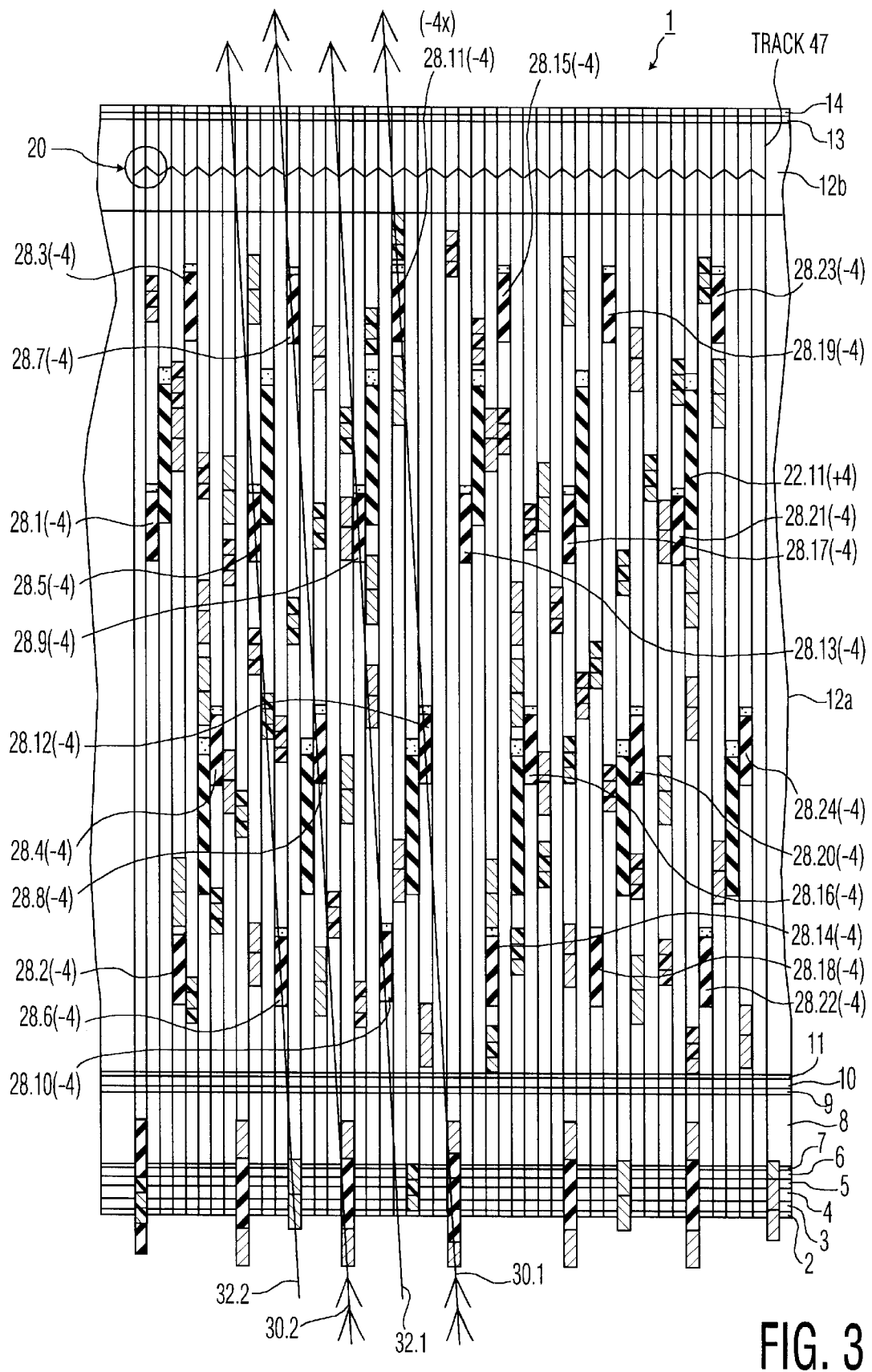
FIG. 3 shows the same format as FIG. 1, with the paths across the record carrier that the two reproduction heads follow during a second trick play reproduction mode, where the record carrier speed is −4 times nominal.

FIG. 3 shows a third information signal being recorded in specific segments in the tracks. Those segments are indicated in FIG. 3 by reference numerals 28.i(−4), where i runs from 1 to 24. This third information signal is meant for a reproduction in a reproduction apparatus at a reproduction speed which is 4 times the nominal reproduction speed in the backwards direction. This third information signal could be an information signal which has no relationship whatsoever with the first and/or the second information signal introduced above. Alternatively, the third information signal could have a relationship with the first information signal, in the sense that the third information signal is a trick play signal for the minus 4 times nominal reproduction speed, in order to obtain a reproduced (video) signal, which is a replica of the reproduced first (video) signal, but reproduced at minus four times the nominal speed (in the backwards direction).

Figure 3A:
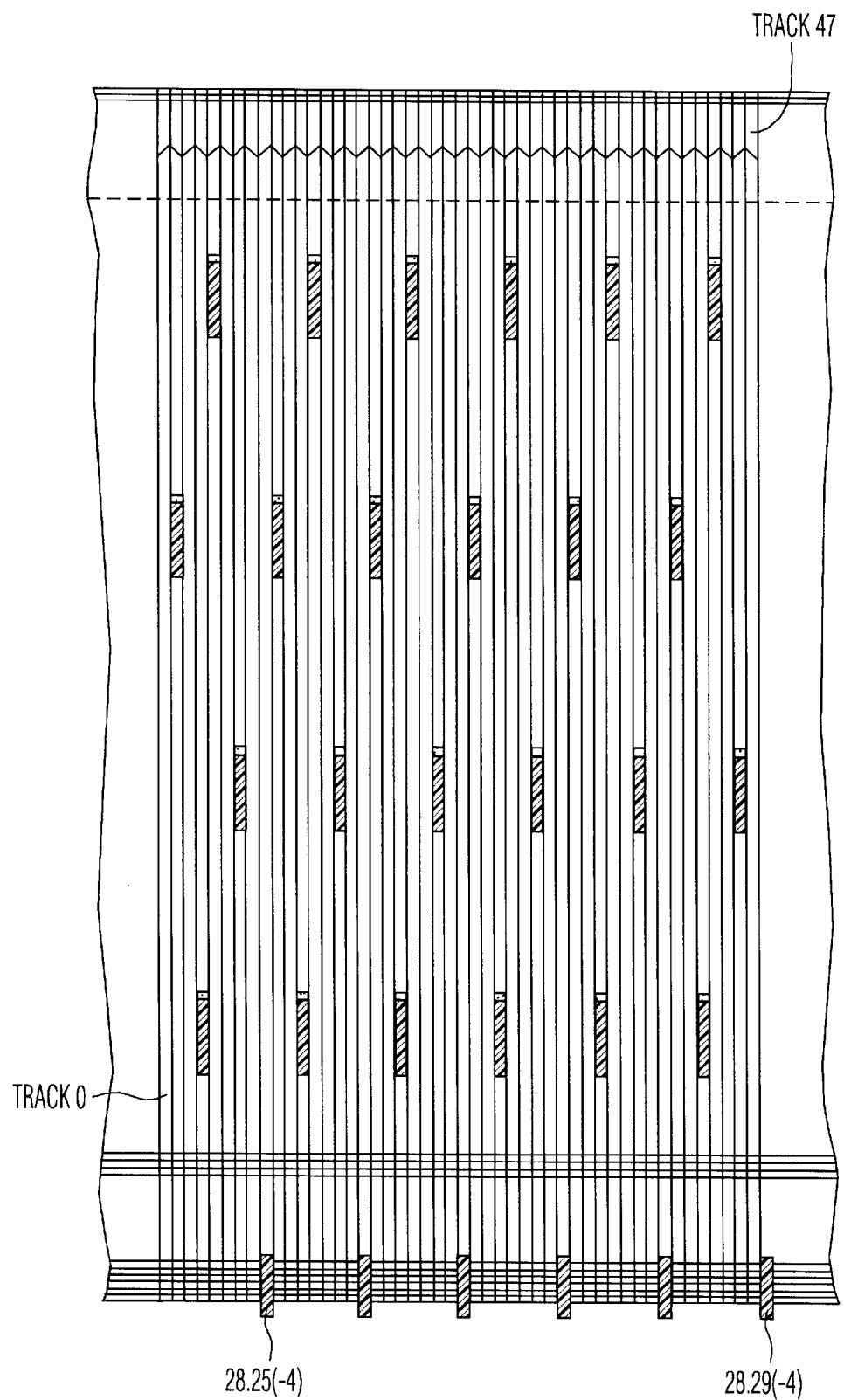
FIG. 3a shows the trick play segments for the −4 times nominal reproduction mode only, in the group of 48 tracks.

FIG. 3a shows the same group of 48 tracks as FIG. 3, however, only the 24 segments 28.i(−4) are shown in FIG. 3a. Assuming the track number of the first track in the group of 48 tracks to be track no. 0 and the track number of the last track in the group to be track number 47, the segments are recorded in the tracks with track number 1+n.8, 3+n.8, 4+n.8 and 6+n.8, where n is an integer running from 0 to 5 inclusive.

FIG. 3 further shows four scanning lines 30.1, 30.2, 32.1 and 32.2. The double arrowed scanning lines 30.1 and 30.2 show the paths that the one head, having the first azimuth angle, follow across the record carrier in the minus four times nominal reproduction mode, during two revolutions of the head drum. The single arrowed scanning lines 32.1 and 32.2 show the paths that the other head, having the second azimuth angle, follow across the record carrier in the minus four times nominal reproduction mode during the said two revolutions of the head drum. As can be seen in FIG. 3, the one head reads the trick play segments 28.i(−4), where i equals 3, 4, 7, 8, 11, 12, 15, 16, 19, 20, 23 and 24, and the other head thus reads the trick play segments 28.j(−4), where j equals 1, 2, 5, 6, 9, 10, 13, 14, 17, 18, 21 and 22.

The trick play segments 28.i(−4) each have a length of (m₁/4=) 25 main sync blocks. A trick play segment for the minus four times trick play speed comprises either 22 sync blocks having information contents as regards the trick play information stored in those sync blocks, and three sync blocks of parity information, or 23 sync blocks having each information contents as regards the trick play information stored in those sync blocks, and two sync blocks of parity information. Again, the parity information stored in the sync blocks comprising the parity information is obtained from an ECC encoding step carried out on the trick play signal.

The trick play segments for the minus 4 times nominal reproduction speed can be realized as explained in the following example. When numbering the main sync blocks, starting from 0, which is the first sync block in the aux recording area 8 in a track, until 305, which is the last sync block in the area 12a in the track, the sync blocks in the segments 28.i(−4), where i equals 2, 6, 10, 14, 18 and 22, are the sync blocks numbered 51 to 75 inclusive in a track, where the sync blocks numbered 74 and 75 are the sync blocks comprising the parity information. Further, the sync blocks in the segments 28.j(−4), where j equals 4, 8, 12, 16, 20, and 24, are the sync blocks numbered 122 to 146 inclusive in a track, where the sync blocks numbered 145 and 146 are the sync blocks comprising the parity information. The sync blocks in the segments 28.k(−4), where k equals 1, 5, 9, 13, 17 and 21, are the sync blocks numbered 194 to 218 inclusive in a track, where the sync blocks numbered 216, 217 and 218 are the sync blocks comprising the parity information. Further, the sync blocks in the segments 28.l(−4), where l equals 3, 7, 11, 15, 19, and 23, are the sync blocks numbered 265 to 289 inclusive in a track, where the sync blocks numbered 287, 288 and 289 are the sync blocks comprising the parity information.

Thus, during each revolution of the head drum, during a minus four times nominal reproduction mode, 100 sync blocks of information of the third information signal (2×22+ 2×23+10 sync blocks) are read from the record carrier. This is the same number of trick play sync blocks as for the 4 times reproduction mode.

FIG. 3a further shows portions, numbered 28.25(−4) to 28.29(−4), located at the lower edge of some of the tracks in the group of 48 tracks. Those locations are locations that can be read in the −4 times nominal reproduction mode by one of the two heads, in the present case, the head having the first azimuth. As the locations shown include the subcode signal recording portion, it is possible to read the information in the subcode signal recording portion, also in the −4 times nominal reproduction mode.

Figure 4:
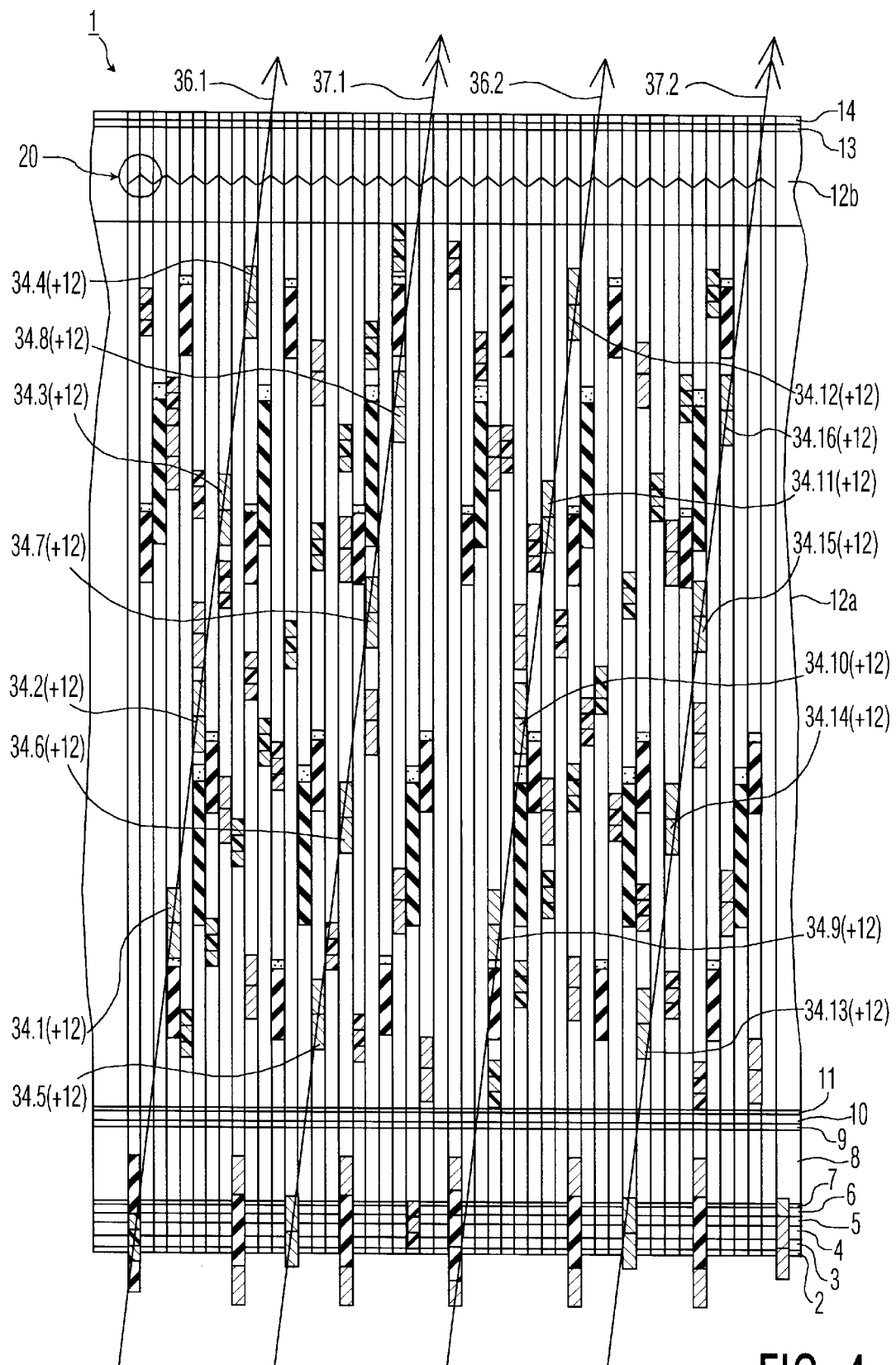
FIG. 4 shows the same format as FIG. 1, with the paths across the record carrier that the two reproduction heads follow during a third trick play reproduction mode, where the record carrier speed is +12 times nominal.

FIG. 4 shows a fourth information signal being recorded in specific segments in the tracks. Those segments are indicated in FIG. 4 by reference numerals 34.i(+12), where i runs from 1 to 16. This fourth information signal is meant for a reproduction in a reproduction apparatus at a reproduction speed which is 12 times the nominal reproduction speed in the forward direction. This fourth information signal could be an information signal which has no relationship whatsoever with the first and/or second and/or third information signal introduced above. Alternatively, the fourth information signal could have a relationship with the first information signal, in the sense that the fourth information signal is a trick play signal for the 12 times nominal reproduction speed in the forward direction, in order to obtain a reproduced (video) signal, which is a replica of the reproduced first (video) signal, but reproduced at 12 times the nominal speed (in the forward direction).

Figure 4A:
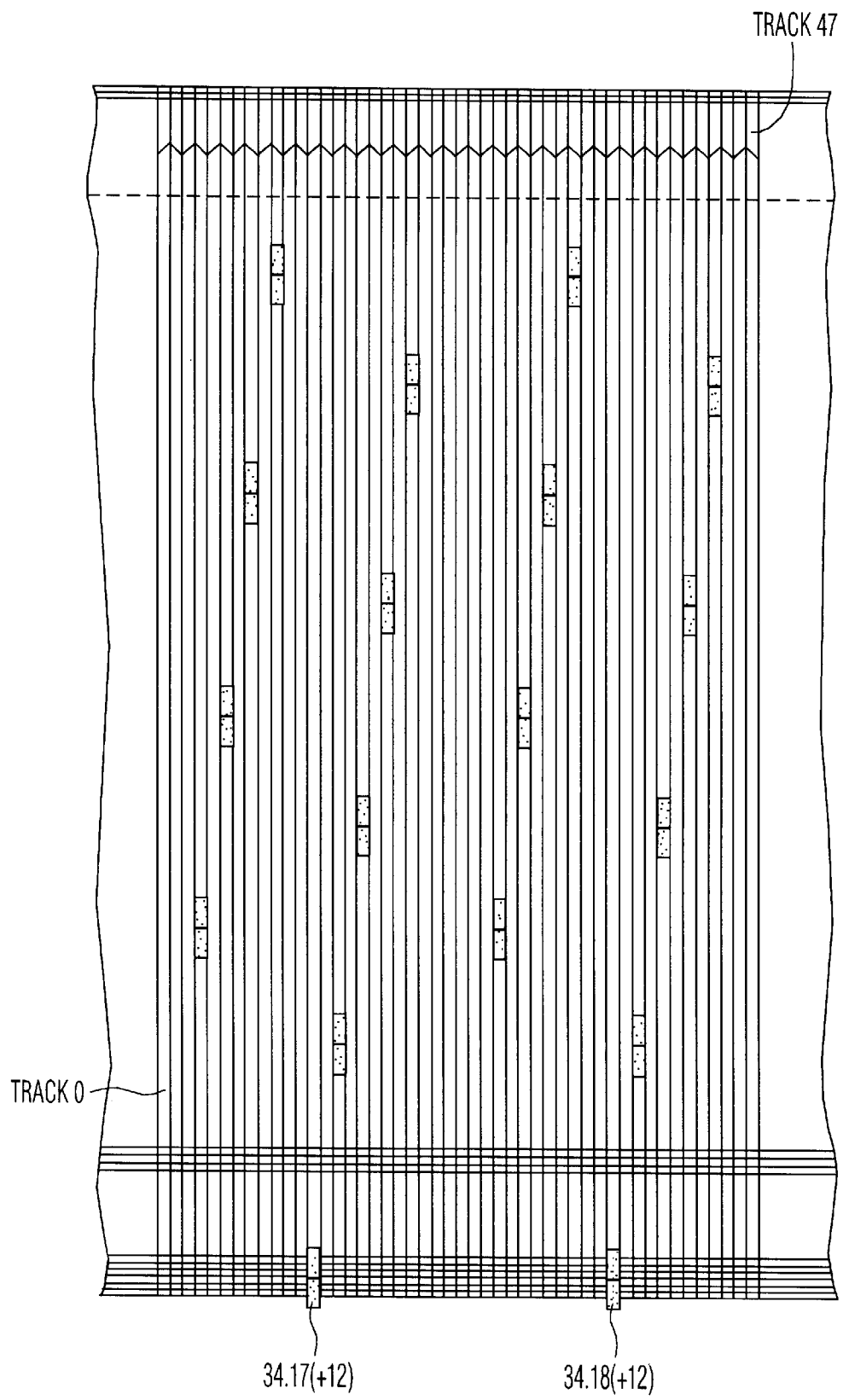
FIG. 4a shows the trick play segments for the +12 times nominal reproduction mode only, in the group of 48 tracks.

FIG. 4a shows the same group of 48 tracks as FIG. 4, however, only the 16 segments 34.i(+12) are shown in FIG. 4a. Assuming the track number of the first track in the group of 48 tracks to be track no. 0 and the track number of the last track in the group to be track number 47, the segments are recorded in the tracks with track number 3+n.2, 14+n.2, 27+n.2 and 38+n.2, where n is an integer running from 0 to 3 inclusive.

FIG. 4 further shows four scanning lines 36.1, 36.2, 37.1 and 37.2. The double arrowed scanning lines 37.1 and 37.2 show the paths that the one head, having the first azimuth angle, follow across the record carrier in the +12 times nominal reproduction mode, during two revolutions of the head drum. The single arrowed scanning lines 36.1 and 36.2 show the paths that the other head, having the second azimuth angle, follow across the record carrier in the +12 times nominal reproduction mode during the said two revolutions of the head drum. As can be seen in FIG. 4, the one head reads the trick play segments 34.i(+12), where i equals 1 to 4 inclusive and 9 to 12 inclusive, and the other head thus reads the trick play segments 34.j(+12), where j equals 5 to 8 inclusive and 13 to 16 inclusive.

There are trick play segments 34.i(+12) that have a length of ((m₂−4)/8=) 22 main sync blocks and trick play segments 34.i(+12) that have a length of ((m₂+12)/8=) 24 sync blocks. A trick play segment having a length of 22 sync blocks comprises 11 sync blocks having information contents as regards the trick play information stored in those sync blocks and further 11 sync blocks being a repetition of each of the 11 sync blocks. A trick play segment having a length of 24 sync blocks comprise 12 sync blocks having information contents as regards the trick play information stored in those sync blocks and further 12 sync blocks being a repetition of each of the 12 sync blocks.

The trick play segments for the +12 times nominal reproduction speed can be realized as explained in the following example. When, again, numbering the main sync blocks, starting from 0, which is the first sync block in the aux recording area 8 in a track, until 305, which is the last sync block in the area 12a in the track, the trick play sync blocks in the segments 34.1(+12) and 34.9(+12) are the sync blocks numbered 76 to 99 inclusive in a track, where the sync blocks numbered 88 to 99 inclusive are repetitions of the sync blocks numbered 76 to 87 inclusive. Further, the trick play sync blocks in the segments 34.2(+12) and 34.10(+12) are the sync block numbered 141 to 162 inclusive in a track, where the sync blocks numbered 152 to 162 inclusive are repetitions of the sync blocks numbered 141 to 151 inclusive. The trick play sync blocks in the segments 34.3(+12) and 34.11(+12) are the sync blocks numbered 206 to 227 inclusive in a track, where the sync blocks numbered 217 to 227 inclusive are repetitions of the sync blocks numbered 206 to 216 inclusive. Further, the trick play sync blocks in the segments 34.4(+12) and 34.12(+12) are the sync blocks numbered 271 to 292 inclusive in a track, where the sync blocks numbered 282 to 292 inclusive are repetitions of the sync blocks numbered 271 to 281 inclusive.

The trick play sync blocks in the segments 34.5(+12) and 34.13(+12) are the sync blocks numbered 44 to 67 inclusive in a track, where the sync blocks numbered 56 to 67 inclusive are repetitions of the sync blocks numbered 44 to 55 inclusive. Further, the trick play sync blocks in the segments 34.6(+12) and 34.14(+12) are the sync blocks numbered 109 to 130 inclusive in a track, where the sync blocks numbered 120 to 130 inclusive are repetitions of the sync blocks numbered 109 to 119 inclusive. The trick play sync blocks in the segments 34.7(+12) and 34.15(+12) are the sync blocks numbered 174 to 195 inclusive in a track, where the sync blocks numbered 185 to 195 inclusive are repetitions of the sync blocks numbered 174 to 184 inclusive. Further, the trick play sync blocks in the segments 34.8(+12) and 34.16(+12) are the sync blocks numbered 239 to 260 inclusive in a track, where the sync blocks numbered 250 to 260 inclusive are repetitions of the sync blocks numbered 239 to 249 inclusive.

Thus, during each revolution of the head drum, during a +12 times nominal reproduction mode, 180 sync blocks (6×22+2×24 sync blocks) of the fourth information signal are read from the record carrier.

FIG. 4a further shows portions, numbered 34.17(+12) and 34.18(+12), located at the lower edge of some of the tracks in the group of 48 tracks. Those locations are locations that can be read in the +12 times nominal reproduction mode by one of the two heads, in the present case, the head having the first azimuth. As the locations shown include the subcode signal recording portion, it is possible to read the information in the subcode signal recording portion, also in the +12 times nominal reproduction mode.

Figure 5:
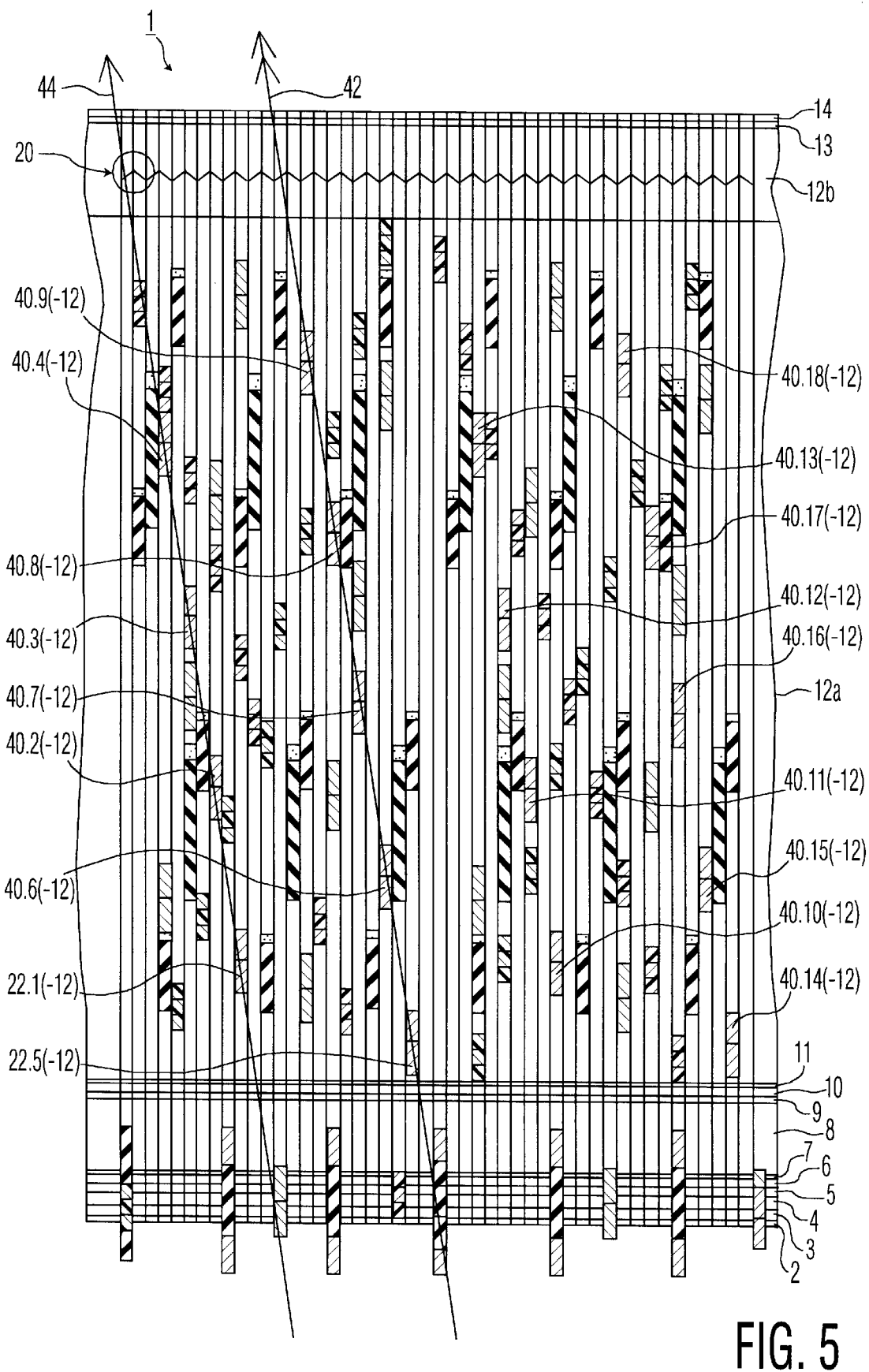
FIG. 5 shows the same format as FIG. 1, with the paths across the record carrier that the two reproduction heads follow during a fourth trick play reproduction mode, where the record carrier speed is −12 times nominal.

FIG. 5 shows a fifth information signal being recorded in specific segments in the tracks. Those segments are indicated in FIG. 5 by reference numerals 40.i(−12), where i runs from 1 to 18. This fifth information signal is meant for a reproduction in a reproduction apparatus at a reproduction speed which is minus 12 times the nominal reproduction speed (that is: in the backwards direction). This fifth information signal could be an information signal which has no relationship whatsoever with the first and/or second and/or third and/or fourth information signal introduced above. Alternatively, the fifth information signal could have a relationship with the first information signal, in the sense that the fifth information signal is a trick play signal for the minus 12 times nominal reproduction speed, in order to obtain a reproduced (video) signal, which is a replica of the reproduced first (video) signal, but reproduced at minus 12 times the nominal speed (in the backwards direction).

Figure 5A:
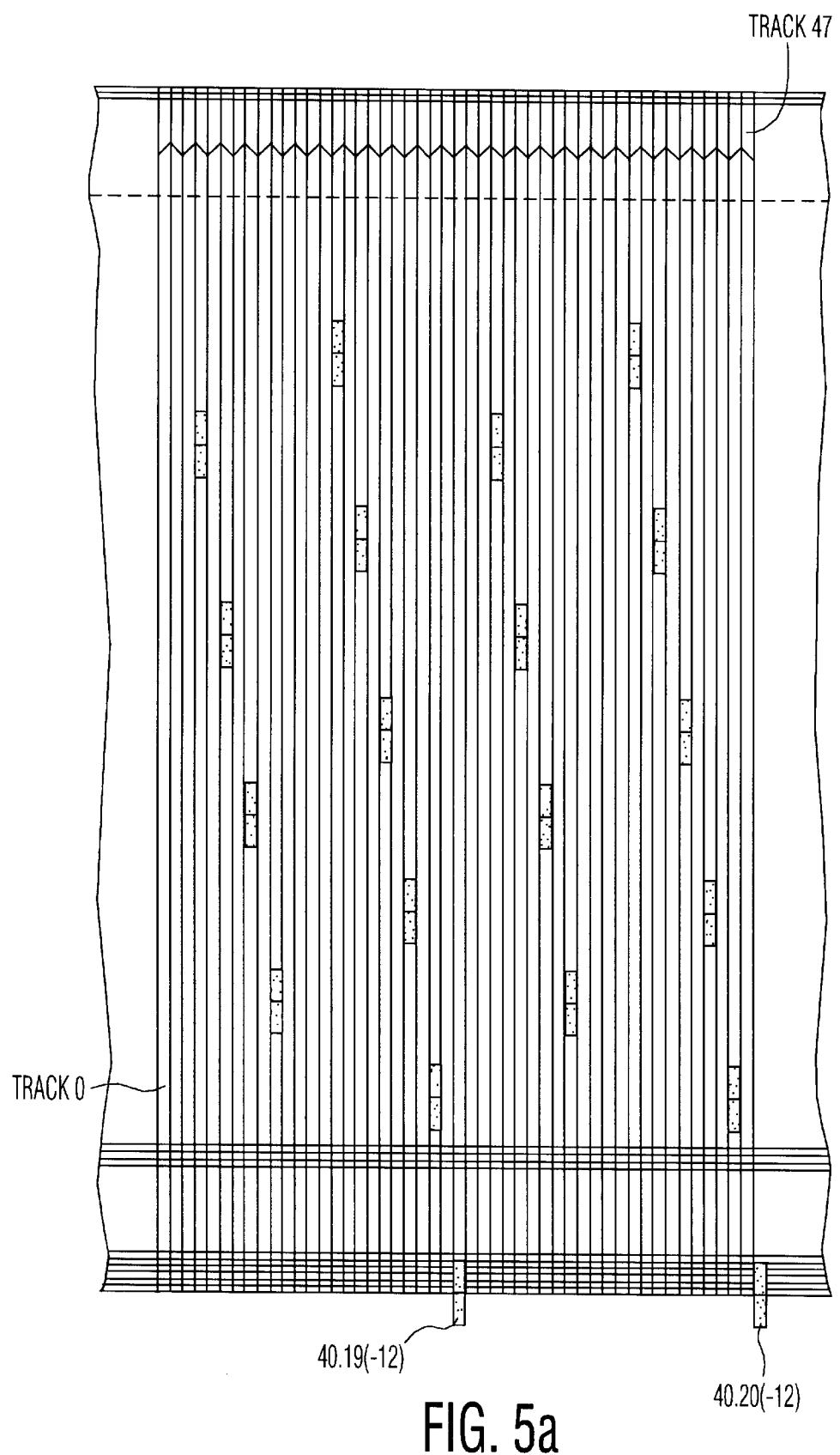
FIG. 5a shows the trick play segments for the −12 times nominal reproduction mode only, in the group of 48 tracks.

FIG. 5a shows the same group of 48 tracks as FIG. 5, however, only the 18 segments 40.i(−12) are shown in FIG. 5a. Assuming the track number of the first track in the group of 48 tracks to be track no. 0 and the track number of the last track in the group to be track number 47, the segments are recorded in the tracks with track number 3+n.2 and 27+n.2, where n is an integer running from 0 to 3 and in tracks with track numbers 14+n.2 and 38+n.2, where n is an integer running from 0 to 4 inclusive.

FIG. 5 further shows only two scanning lines 42 and 44. The double arrowed scanning line 42 shows the path that the one head, having the first azimuth angle, follow across the record carrier in the −12 times nominal reproduction mode, during one revolution of the head drum. The single arrowed scanning line 44 shows the path that the other head, having the second azimuth angle, follow across the record carrier in the −12 times nominal reproduction mode during the said one revolution of the head drum. As can be seen in FIG. 5, the one head reads the trick play segments 40.i(−12), where i equals 5 to 9 inclusive (and also 14 to 18 inclusive), and the other head thus reads the trick play segments 40.j(−12), where j equals 1 to 4 inclusive and 10 to 13 inclusive.

The trick play segments 40.i(−12) each have a length of 20 main sync blocks, where each trick play segment comprises 10 sync blocks having information contents as regards the trick play information stored in those sync blocks and further 10 sync blocks being a repetition of each of the 10 sync blocks.

The trick play segments for the −12 times nominal reproduction speed can be realized as explained in the following example. When, again, numbering the main sync blocks, starting from 0, which is the first sync block in the aux recording area 8 in a track, until 305, which is the last sync block in the area 12a in the track, the sync blocks in the segments 40.5(−12) and 40.14(−12) are the sync blocks numbered 30 to 49 inclusive in a track, where the sync blocks numbered 40 to 49 inclusive are repetitions of the sync blocks numbered 30 to 39 inclusive. Further, the sync blocks in the segments 40.1(−12) and 40.10(−12) are the sync blocks numbered 57 to 76 inclusive in a track, where the sync blocks numbered 67 to 76 inclusive are repetitions of the sync blocks numbered 57 to 66 inclusive. The sync blocks in the segments 40.6(−12) and 40.15(−12) are the sync blocks in a track numbered 85 to 104 inclusive, where the sync blocks numbered 95 to 104 inclusive are repetitions of the sync blocks numbered 85 to 94 inclusive. Further, the sync blocks in the segments 40.2(−12) and 40.11(−12) are the sync blocks in a track numbered 112 to 131 inclusive, where the sync blocks numbered 122 to 131 inclusive are repetitions of the sync blocks numbered 112 to 121 inclusive.

The sync blocks in the segments 40.7(−12) and 40.16(−12) are the sync blocks in a track numbered 139 to 158 inclusive, where the sync blocks numbered 149 to 158 inclusive are repetitions of the sync blocks numbered 139 to 148 inclusive. Further, the sync blocks in the segments 40.3(−12) and 40.12(−12) are the sync blocks in a track numbered 167 to 186 inclusive, where the sync blocks numbered 177 to 186 inclusive are repetitions of the sync blocks numbered 167 to 176 inclusive. The sync blocks in the segments 40.8(−12) and 40.17(−12) are the sync blocks in a track numbered 194 to 213 inclusive, where the sync blocks numbered 204 to 213 inclusive are repetitions of the sync blocks numbered 194 to 203 inclusive. Further, the sync blocks in the segments 40.4(−12) and 40.13(−12) are the sync blocks in a track numbered 222 to 241 inclusive, where the sync blocks numbered 232 to 241 inclusive are repetitions of the sync blocks numbered 222 to 231 inclusive. At last, the sync blocks in the segments 40.9(−12) and 40.18(−12) are the sync blocks in a track numbered 249 to 268 inclusive, where the sync blocks numbered 259 to 268 inclusive are repetitions of the sync blocks numbered 249 to 258 inclusive.

Thus, during each revolution of the head drum, during a −12 times nominal reproduction mode, 180 sync blocks (9×20 sync blocks) of information of the fifth information signal are read from the record carrier, which is the same number of sync blocks as for the +12× reproduction mode.

FIG. 5a further shows portions, numbered 40.19(−12) and 40.20(−12), located at the lower edge of some of the tracks in the group of 48 tracks. Those locations are locations that can be read in the −12 times nominal reproduction mode by one of the two heads, in the present case, the head having the first azimuth. As the locations shown include the subcode signal recording portion, it is possible to read the information in the subcode signal recording portion, also in the −12 times nominal reproduction mode.

Figure 6:
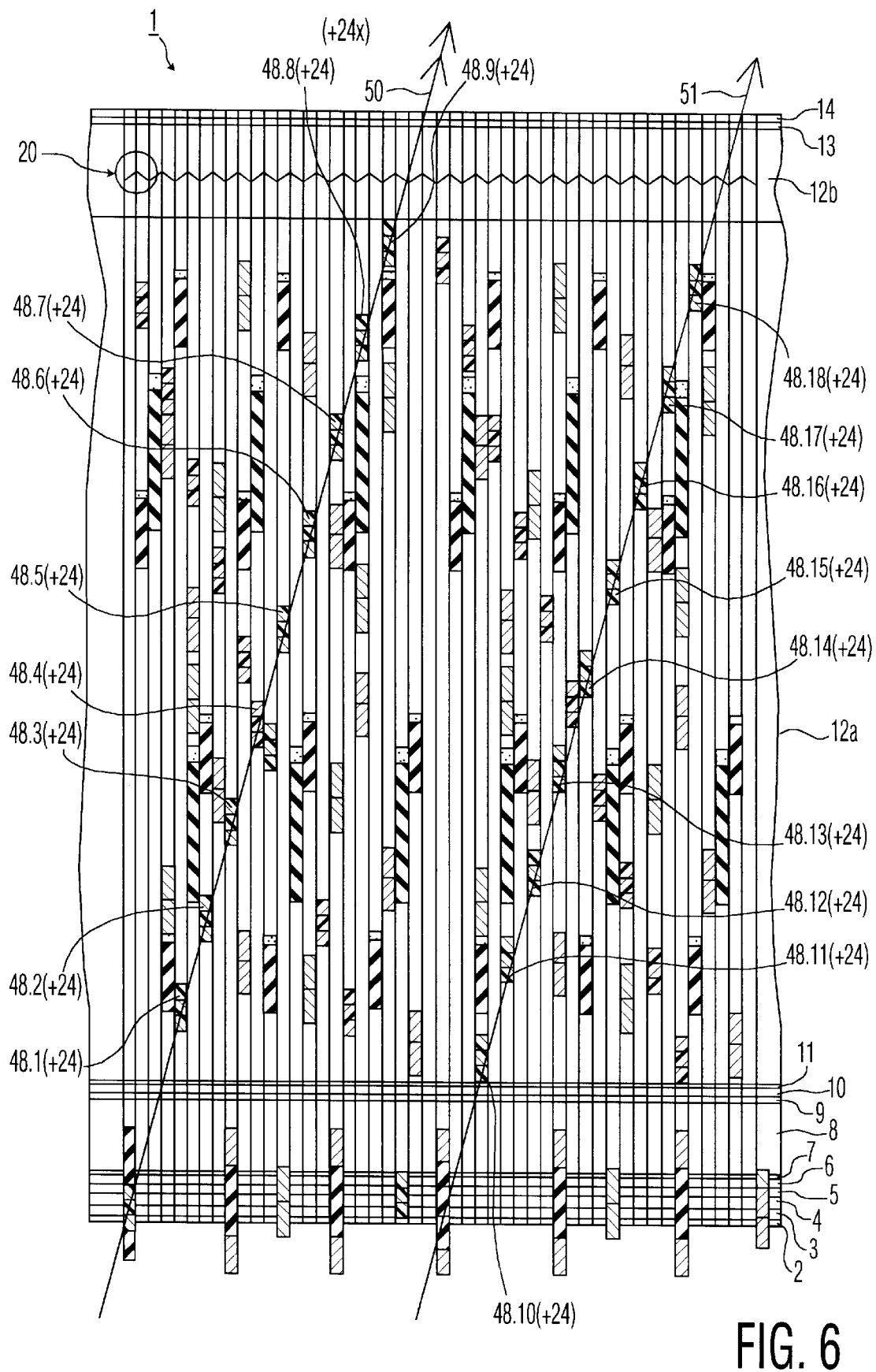
FIG. 6 shows the same format as FIG. 1, with the paths across the record carrier that the two reproduction heads follow during a fifth trick play reproduction mode, where the record carrier speed is +24 times nominal.

FIG. 6 shows a sixth information signal being recorded in specific segments in the tracks. Those segments are indicated in FIG. 6 by reference numerals 48.i(+24), where i runs from 1 to 18. This sixth information signal is meant for a reproduction in a reproduction apparatus at a reproduction speed which is +24 times the nominal reproduction speed (that is: in the forward direction). This sixth information signal could be an information signal which has no relationship whatsoever with the first and/or second and/or third and/or fourth and/or fifth information signal introduced above. Alternatively, the sixth information signal could have a relationship with the first information signal, in the sense that the sixth information signal is a trick play signal for the +24 times nominal reproduction speed, in order to obtain a reproduced (video) signal, which is a replica of the reproduced first (video) signal, but reproduced at +24 times the nominal speed.

Figure 6A:
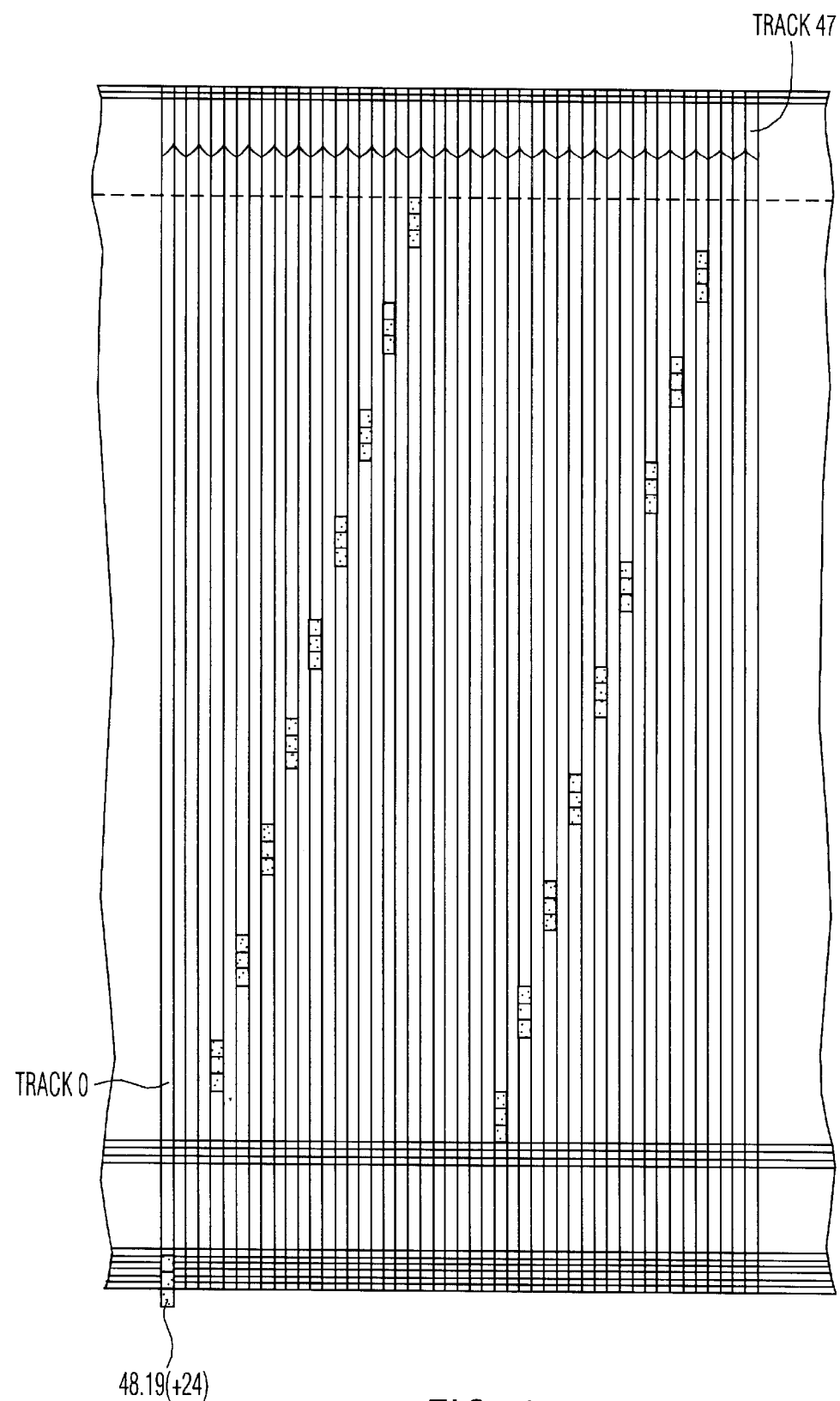
FIG. 6a shows the trick play segments for the +24 times nominal reproduction mode only, in the group of 48 tracks.

FIG. 6a shows the same group of 48 tracks as FIG. 6, however, only the 18 segments 48.i(+24) are shown in FIG. 6a. Assuming the track number of the first track in the group of 48 tracks to be track no. 0 and the track number of the last track in the group to be track number 47, the segments are recorded in the tracks with track number 4+n.2 and 27+n.2, where n is an integer running from 0 to 8 inclusive.

FIG. 6 further shows two scanning lines 50 and 51. The double arrowed scanning line 50 shows the path that the one head, having the first azimuth angle, follow across the record carrier in the +24 times nominal reproduction mode, during one revolution of the head drum. The single arrowed scanning line 51 shows the path that the other head, having the second azimuth angle, follow across the record carrier in the +24 times nominal reproduction mode during the said one revolution of the head drum. As can be seen in FIG. 6, the one head reads the trick play segments 48.i(+24), where i equals 1 to 9 inclusive, and the other head thus reads the trick play segments 48.j(+24), where j equals 10 to 18 inclusive.

The trick play segments 48.i(+24) each have a length of 15 main sync blocks, where each segment comprises 5 sync blocks having information contents as regards the trick play information stored in those sync blocks and further, those 5 sync blocks are each repeated twice.

The trick play segments for the +24 times nominal reproduction speed can be realized as explained in the following example. When, again, numbering the main sync blocks, starting from 0, which is the first sync block in the aux recording area 8 in a track, until 305, which is the last sync block in the area 12a in the track, the sync blocks in the segment 48.10(+24) are the sync blocks in a track numbered 29 to 43 inclusive, where the sync blocks numbered 34 to 38 inclusive and 39 to 43 inclusive are repetitions of the sync blocks 29 to 33 inclusive. The sync blocks in the segment 48.1(+24) are the sync blocks in a track numbered 43 to 57 inclusive, where the sync blocks numbered 48 to 52 inclusive and 53 to 57 inclusive are repetitions of the sync blocks numbered 43 to 47 inclusive. The sync blocks in the segment 48.11(+24) are the sync blocks in a track numbered 60 to 74 inclusive, where the sync blocks numbered 65 to 69 inclusive and 70 to 74 inclusive are repetitions of the sync blocks 60 to 64. The sync blocks in the segment 48.2(+24) are the sync blocks in a track numbered 74 to 88 inclusive, where the sync blocks numbered 79 to 83 inclusive and 84 to 88 inclusive are repetitions of the sync blocks numbered 74 to 78 inclusive. The sync blocks in the segment 48.12(+24) are the sync blocks in a track numbered 91 to 105 inclusive, where the sync blocks numbered 96 to 100 inclusive and 101 to 105 inclusive are repetitions of the sync blocks 91 to 95 inclusive. The sync blocks in the segment 48.3(+24) are the sync blocks in a track numbered 105 to 119 inclusive, where the sync blocks numbered 110 to 114 inclusive and the sync blocks 115 to 119 inclusive are repetitions of the sync blocks numbered 105 to 109 inclusive. Further, the sync blocks in the segment 48.13(+24) are the sync blocks in a track numbered 122 to 136 inclusive, where the sync blocks numbered 127 to 131 inclusive and 132 to 136 inclusive are repetitions of the sync blocks 122 to 126 inclusive. The sync blocks in the segment 48.4(+24) are the sync blocks in a track numbered 136 to 150 inclusive, where the sync blocks numbered 141 to 145 inclusive and the sync blocks 146 to 150 are repetitions of the sync blocks numbered 136 to 140 inclusive.

The sync blocks in the segment 48.14(+24) are the sync blocks in a track numbered 153 to 167 inclusive, where the sync blocks numbered 158 to 162 inclusive and the sync blocks numbered 163 to 167 inclusive are repetitions of the sync blocks numbered 153 to 157 inclusive. The sync blocks in the segment 48.5(+24) are the sync blocks in a track numbered 167 to 181 inclusive, where the sync blocks numbered 172 to 176 inclusive and 177 to 181 inclusive are repetitions of the sync blocks numbered 167 to 171 inclusive.

The sync blocks in the segment 48.15(+24) are the sync blocks in a track numbered 184 to 198 inclusive, where the sync blocks numbered 189 to 193 inclusive and the sync blocks numbered 194 to 198 inclusive are repetitions of the sync blocks numbered 184 to 188 inclusive. The sync blocks in the segment 48.6(+24) are the sync blocks in a track numbered 198 to 212 inclusive, where the sync blocks numbered 203 to 207 inclusive and 208 to 212 inclusive are repetitions of the sync blocks numbered 198 to 202 inclusive.

The sync blocks in the segment 48.16(+24) are the sync blocks in a track numbered 215 to 229. inclusive, where the sync blocks numbered 220 to 224 inclusive and the sync blocks numbered 225 to 229 inclusive are repetitions of the sync blocks numbered 215 to 219 inclusive. The sync blocks in the segment 48.7(+24) are the sync blocks in a track numbered 229 to 243 inclusive, where the sync blocks numbered 234 to 238 inclusive and 239 to 243 inclusive are repetitions of the sync blocks numbered 229 to 233 inclusive.

The sync blocks in the segment 48.17(+24) are the sync blocks in a track numbered 246 to 260 inclusive, where the sync blocks numbered 251 to 255 inclusive and the sync blocks numbered 256 to 260 inclusive are repetitions of the sync blocks numbered 246 to 250 inclusive. The sync blocks in the segment 48.8(+24) are the sync blocks in a track numbered 260 to 274 inclusive, where the sync blocks numbered 265 to 269 inclusive and 270 to 274 inclusive are repetitions of the sync blocks numbered 260 to 264 inclusive.

The sync blocks in the segment 48.18(+24) are the sync blocks in a track numbered 277 to 291 inclusive, where the sync blocks numbered 282 to 286 inclusive and the sync blocks numbered 287 to 291 inclusive are repetitions of the sync blocks numbered 277 to 281 inclusive. The sync blocks in the segment 48.9(+24) are the sync blocks in a track numbered 291 to 305 inclusive, where the sync blocks numbered 296 to 300 inclusive and 301 to 305 inclusive are repetitions of the sync blocks numbered 291 to 295 inclusive.

Thus, during each revolution of the head drum, during a +24 times nominal reproduction mode, 270 sync blocks (18×15 sync blocks) of information of the sixth information signal are read from the record carrier.

FIG. 6a further shows a portion, numbered 48.19(+24), located at the lower edge of one of the tracks in the group of 48 tracks. This location is a location that can be read in the +24 times nominal reproduction mode by one of the two heads, in the present case, the head having the first azimuth. As the location shown includes the subcode signal recording portion, it is possible to read the information in the subcode signal recording portion, also in the +24 times nominal reproduction mode.

Figure 7:
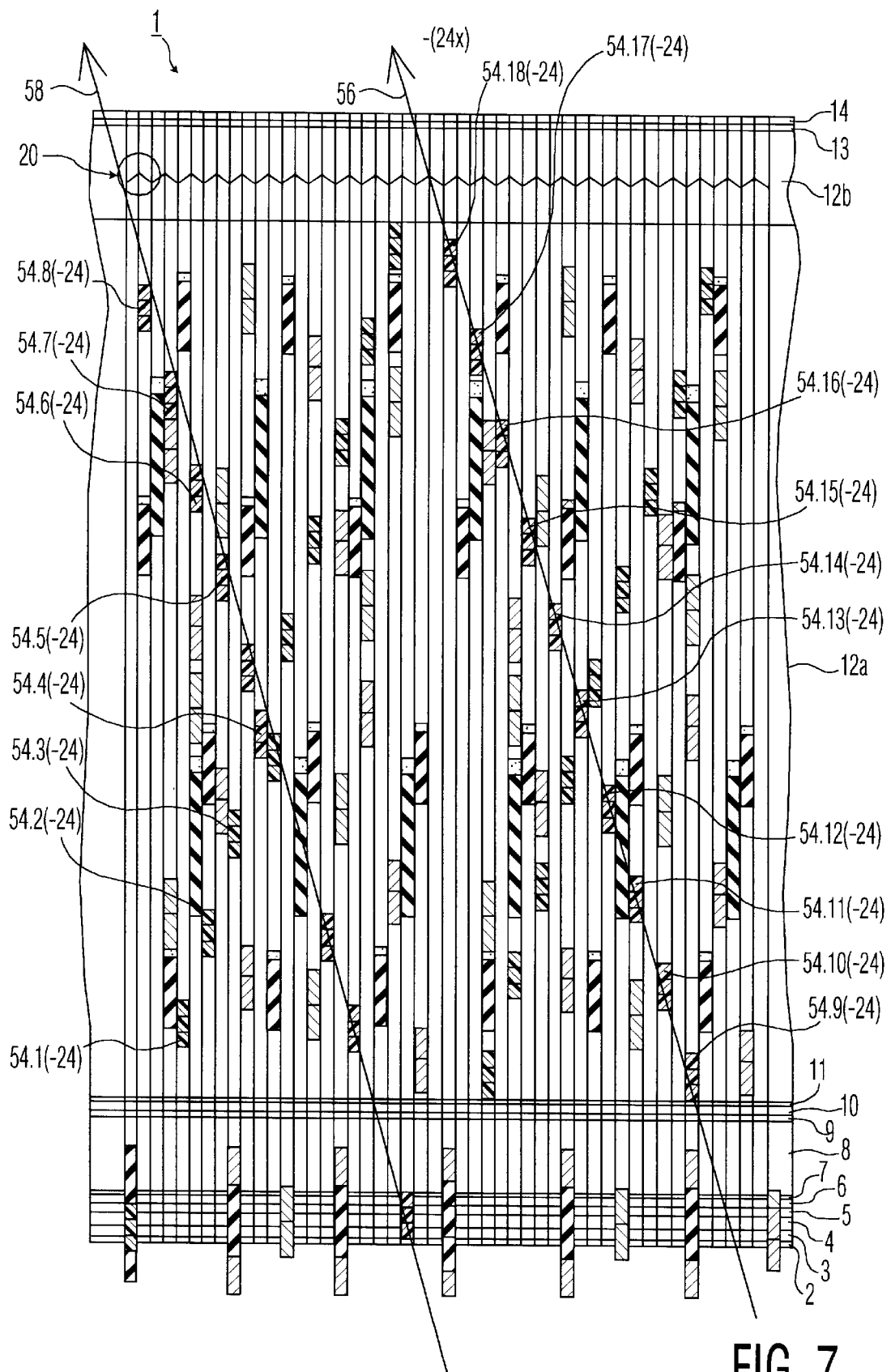
FIG. 7 shows the same format as FIG. 1, with the paths across the record carrier that the two reproduction heads follow during a sixth trick play reproduction mode, where the record carrier speed is −24 times nominal.

FIG. 7 shows a seventh information signal being recorded in specific segments in the tracks. Those segments are indicated in FIG. 7 by reference numerals 54.i(−24), where i runs from 1 to 18. This seventh information signal is meant for a reproduction in a reproduction apparatus at a reproduction speed which is −24 times the nominal reproduction speed (that is: in the backwards direction). This seventh information signal could be an information signal which has no relationship whatsoever with the first and/or second and/or third and/or fourth and/or fifth and/or sixth information signal introduced above. Alternatively, the seventh information signal could have a relationship with the first information signal, in the sense that the seventh information signal is a trick play signal for the −24 times nominal reproduction speed, in order to obtain a reproduced (video) signal, which is a replica of the reproduced first (video) signal, but reproduced at −24 times the nominal speed (that is: in the backwards direction).

Figure 7A:
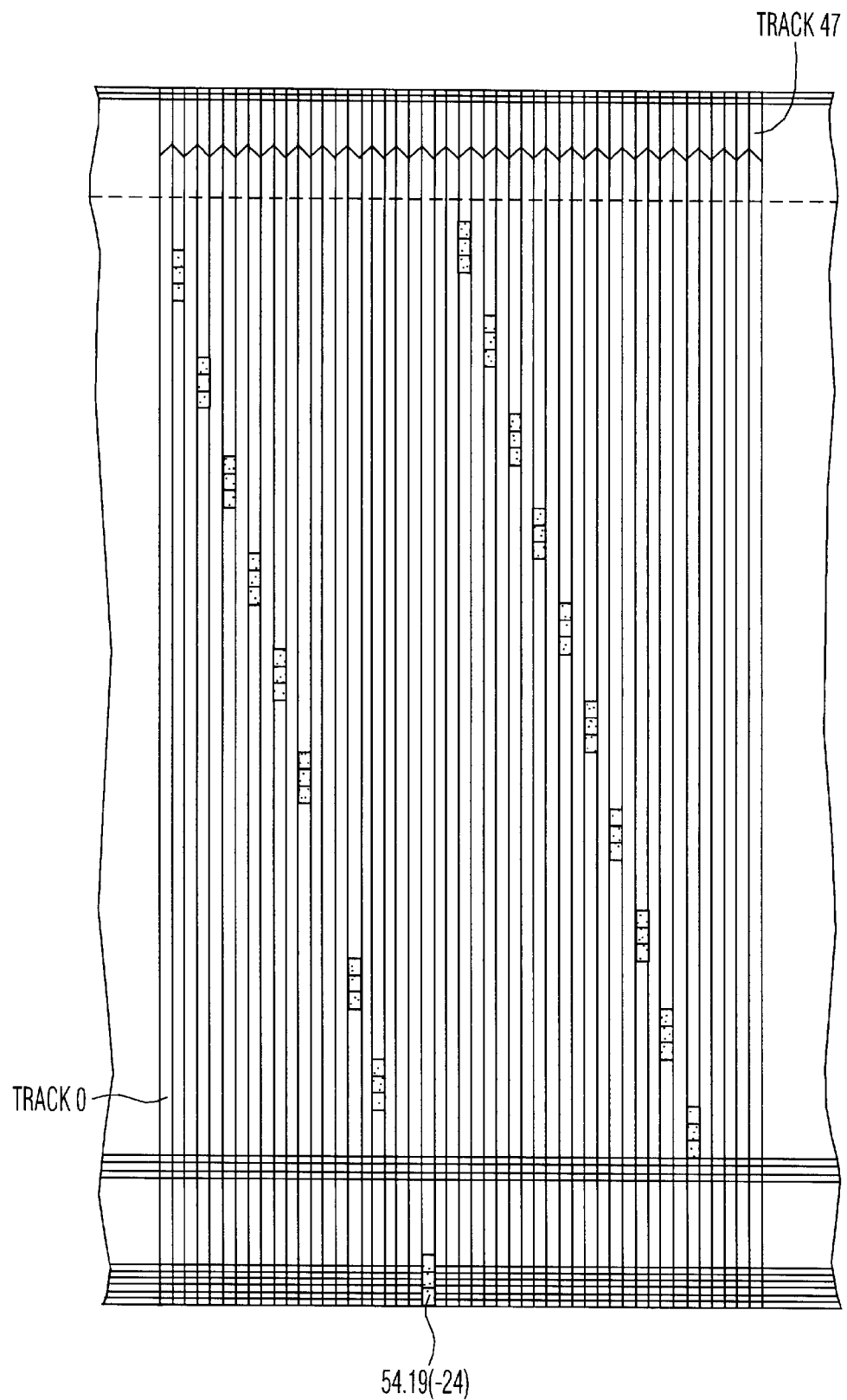
FIG. 7a shows the trick play segments for the −24 times nominal reproduction mode only, in the group of 48 tracks.

FIG. 7a shows the same group of 48 tracks as FIG. 7, however, only the 18 segments 54.i(−24) are shown in FIG. 7a. Assuming the track number of the first track in the group of 48 tracks to be track no. 0 and the track number of the last track in the group to be track number 47, the segments are recorded in the tracks with track number 1+n.2, 24+n.2 and 34+n.2, where n is an integer running from 0 to 4 inclusive and the tracks 11, 15 and 17.

FIG. 7 further shows two scanning lines 58 and 56. The double arrowed scanning line 56 shows the path that the one head, having the first azimuth angle, follow across the record carrier in the −24 times nominal reproduction mode, during one revolution of the head drum. The single arrowed scanning line 58 shows the path that the other head, having the second azimuth angle, follow across the record carrier in the −24 times nominal reproduction mode during the said one revolution of the head drum. As can be seen in FIG. 7, the one head reads the trick play segments 54.i(−24), where i equals 1 to 8 inclusive, and the other head thus reads the trick play segments 54.j(−24), where j equals 9 to 18 inclusive.

The trick play segments 54.i(−24) each have a length of 15 main sync blocks, where each segment comprises 5 sync blocks having information contents as regards the trick play information stored in those sync blocks and further, those 5 sync blocks are each repeated twice.

The trick play segments for the −24 times nominal reproduction speed can be realized as explained in the following example. When, again, numbering the main sync blocks, starting from 0, which is the first sync block in the aux recording area 8 in a track, until 305, which is the last sync block in the area 12a in the track, the sync blocks in the segment 54.9(−24) are the sync blocks in a track numbered 29 to 43 inclusive, where the sync blocks numbered 34 to 38 inclusive and 39 to 43 inclusive are repetitions of the sync blocks 29 to 33 inclusive. The sync blocks in the segment 54.1(−24) are the sync blocks in a track numbered 43 to 57 inclusive, where the sync blocks numbered 48 to 52 inclusive and 53 to 57 inclusive are repetitions of the sync blocks numbered 43 to 47 inclusive. The sync blocks in the segment 54.10(−24) are the sync blocks in a track numbered 57 to 71 inclusive, where the sync blocks numbered 62 to 66 inclusive and 67 to 71 inclusive are repetitions of the sync blocks 57 to 61. The sync blocks in the segment 54.2(−24) are the sync blocks in a track numbered 71 to 85 inclusive, where the sync blocks numbered 76 to 80 inclusive and 81 to 85 inclusive are repetitions of the sync blocks numbered 71 to 75 inclusive. The sync blocks in the segment 54.11(−24) are the sync blocks in a track numbered 86 to 100 inclusive, where the sync blocks numbered 91 to 95 inclusive and 96 to 100 inclusive are repetitions of the sync blocks 86 to 90 inclusive. The sync blocks in the segment 54.3(−24) are the sync blocks in a track numbered 128 to 142 inclusive, where the sync blocks numbered 133 to 137 inclusive and the sync blocks 138 to 142 inclusive are repetitions of the sync blocks numbered 128 to 132 inclusive. Further, the sync blocks in the segment 54.12(−24) are the sync blocks in a track numbered 114 to 128 inclusive, where the sync blocks numbered 119 to 123 inclusive and 124 to 128 inclusive are repetitions of the sync blocks 114 to 118 inclusive. The sync blocks in the segment 54.4(−24) are the sync blocks in a track numbered 157 to 171 inclusive, where the sync blocks numbered 162 to 166 inclusive and the sync blocks 167 to 171 are repetitions of the sync blocks numbered 157 to 161 inclusive.

The sync blocks in the segment 54.13(−24) are the sync blocks in a track numbered 143 to 157 inclusive, where the sync blocks numbered 148 to 152 inclusive and the sync blocks numbered 153 to 157 inclusive are repetitions of the sync blocks numbered 143 to 147 inclusive. The sync blocks in the segment 54.5(−24) are the sync blocks in a track numbered 185 to 199 inclusive, where the sync blocks numbered 190 to 194 inclusive and 195 to 199 inclusive are repetitions of the sync blocks numbered 185 to 189 inclusive.

The sync blocks in the segment 54.14(−24) are the sync blocks in a track numbered 171 to 185 inclusive, where the sync blocks numbered 176 to 180 inclusive and the sync blocks numbered 181 to 185 inclusive are repetitions of the sync blocks numbered 171 to 175 inclusive. The sync blocks in the segment 54.6(−24) are the sync blocks in a track numbered 214 to 228 inclusive, where the sync blocks numbered 219 to 223 inclusive and 224 to 228 inclusive are repetitions of the sync blocks numbered 214 to 218 inclusive.

The sync blocks in the segment 54.15(−24) are the sync blocks in a track numbered 200 to 214 inclusive, where the sync blocks numbered 205 to 209 inclusive and the sync blocks numbered 210 to 214 inclusive are repetitions of the sync blocks numbered 200 to 204 inclusive. The sync blocks in the segment 54.7(−24) are the sync blocks in a track numbered 242 to 256 inclusive, where the sync blocks numbered 247 to 251 inclusive and 252 to 256 inclusive are repetitions of the sync blocks numbered 242 to 246 inclusive.

The sync blocks in the segment 54.16(−24) are the sync blocks in a track numbered 228 to 242 inclusive, where the sync blocks numbered 233 to 237 inclusive and the sync blocks numbered 238 to 242 inclusive are repetitions of the sync blocks numbered 228 to 232 inclusive. The sync blocks in the segment 54.8(−24) are the sync blocks in a track numbered 271 to 285 inclusive, where the sync blocks numbered 276 to 280 inclusive and 281 to 285 inclusive are repetitions of the sync blocks numbered 271 to 275 inclusive.

The sync blocks in the segment 54.17(−24) are the sync blocks in a track numbered 257 to 271 inclusive, where the sync blocks numbered 262 to 266 inclusive and the sync blocks numbered 267 to 271 inclusive are repetitions of the sync blocks numbered 257 to 261 inclusive. The sync blocks in the segment 54.18(−24) are the sync blocks in a track numbered 285 to 299 inclusive, where the sync blocks numbered 290 to 294 inclusive and 295 to 299 inclusive are repetitions of the sync blocks numbered 285 to 289 inclusive.

Thus, during each revolution of the head drum, during a −24 times nominal reproduction mode, 270 sync blocks (18×15 sync blocks) of information of the seventh information signal are read from the record carrier, which is the same number of sync blocks as in the +24× reproduction mode.

FIG. 7a further shows a portion, numbered 54.19(−24), located at the lower edge of one of the tracks in the group of 48 tracks. This location is a location that can be read in the −24 times nominal reproduction mode by one of the two heads, in the present case, the head having the second azimuth. As the location shown includes the subcode signal recording portion, it is possible to read the information in the subcode signal recording portion, also in the −24 times nominal reproduction mode.

The trick play sync blocks for each of the various trick play modes described above have their own trick play sync block numbering. The trick play sync block numbering that will be discussed now, is thus different from the numbers used above to identify the exact locations of the various segments in a track.

As a general rule, it can be said that:

(a) for the trick play speeds +4× nominal and −4× nominal, in total, 100 trick play sync blocks are read during each revolution of the head drum, that is, 90 sync blocks comprising information of the trick play signals in question, and 10 sync blocks comprising parity information. Those 90 trick play sync blocks are numbered 0 to 89 inclusive, in the order in which they are read during one revolution of the head drum in the trick play reproduction mode, where the trick play sync block 0 is the first trick play sync block read by the head having the first azimuth. The 10 parity sync blocks are numbered 90 to 99, in the order in which they are read during one revolution of the head drum, where the trick play sync block 90 is the first trick play sync block comprising parity information that is read by the head having the first azimuth.

(b) for the trick play speeds +12× and −12× nominal, in total, 180 trick play sync blocks are read during each revolution of the head drum, that is, 2 times 90 trick play sync blocks, as each trick play segment includes a number of 90 trick play sync blocks and one repetition of each of those 90 trick play sync blocks. Those 90 trick play sync blocks are again numbered 0 to 89 inclusive, in the order in which they are read during the said one revolution of the head in the trick play reproduction mode, where the sync block having the number 0 is the first trick play sync block that is read by the head having the first azimuth.

(c) for the trick play speeds +24× and −24× nominal, in total, 270 trick play sync blocks are read during each revolution of the head drum, that is, 3 times 90 trick play sync blocks, as each trick play segment includes a number of 90 trick play sync blocks and two repetitions of each of those 90 trick play sync blocks. Those 90 trick play sync blocks are again numbered 0 to 89 inclusive, in the order in which they are read during the said one revolution of the head in the trick play reproduction mode, where the sync block having the number 0 is the first trick play sync block that is read by the head having the first azimuth.

First, the trick play sync block numbering for the first trick play signal (+4× reproduction speed) will be discussed. In the time interval of one rotation of the head drum, during reproduction at the +4 times reproduction speed, the first head having the first azimuth angle scans the trick play segment 22.5(+4) and the other head scans the trick play segment 22.6(+4). The first 45 sync blocks in the segment 22.5(+4) have trick play sync block numbers running from 0 to 44 inclusive. The first 45 sync blocks in the segment 22.6(+4) have trick play sync block numbers running from 45 to 89 inclusive.

The five sync blocks in the segment 22.5(+4) comprising the parity information, following the 45 sync blocks numbered 0 to 44 inclusive, have trick play sync block numbers 90 to 94 inclusive and the five sync blocks in the segment 22.6(+4) comprising the parity information, following the 45 sync blocks numbered 45 to 89 inclusive, have trick play sync block numbers 95 to 99 inclusive.

The trick play sync block numbering described above is valid for all the pairs of segments 22.i(+4) and 22.i+1(+4), where i is odd. The trick play sync block numbering is thus repetitive for each rotation of the head drum in the +4 times reproduction mode.

It is thus interesting to note that the trick play sync block numbering in a segment is discontinuous across the boundary between the sync blocks comprising the parity information and the other sync blocks in the segment.

Next, the trick play sync block numbering for the second trick play signal (−4× reproduction speed) will be discussed. In the time interval of one rotation of the head drum, during reproduction at the −4 times reproduction speed, the first head having the first azimuth angle scans the trick play segments 28.12(−4) and 28.11(−4) and the other head scans the trick play segments 28.10(−4) and 28.9(−4). The first 23 sync blocks in the segment 28.12(−4) have trick play sync block numbers running from 0 to 22 inclusive. The first 22 sync blocks in the segment 28.11(−4) have trick play sync block numbers running from 23 to 44 inclusive.

The first 23 sync blocks in the segment 28.10(−4) have trick play sync block numbers running from 45 to 67 inclusive. The first 22 sync blocks in the segment 28.9(−4) have trick play sync block numbers running from 68 to 89 inclusive.

The two sync blocks in the segment 28.12(−4) comprising the parity information, following the 23 sync blocks numbered 0 to 22 inclusive, have trick play sync block numbers 90 and 91. The three sync blocks in the segment 28.11(−4) comprising the parity information, following the 22 sync blocks numbered 23 to 44 inclusive, have trick play sync block numbers 92 to 94 inclusive. The two sync blocks in the segment 28.10(−4) comprising the parity information, following the 23 sync blocks numbered 45 to 67 inclusive, have trick play sync block numbers 95 and 96. The three sync blocks in the segment 28.9(−4) comprising the parity information, following the 22 sync blocks numbered 68 to 89 inclusive, have trick play sync block numbers 97 to 99 inclusive.

The trick play sync block numbering described above is valid for all groups of four segments 28.i(−4), 28.i−1(−4), 28.i−2(−4) and 28.i−3(−4), where i equals 4, 8, 12, 16, 20 and 24. The trick play sync block numbering is thus repetitive for each rotation of the head drum in the −4 times reproduction mode.

It is further again interesting to note that the trick play sync block numbering in a segment is discontinuous across the boundary between the sync blocks comprising the parity information and the other sync blocks in the segment.

The reason for choosing the order of occurrence of the trick play sync blocks and trick play sync block numbering for the +4× and −4× trick play reproduction mode in the way as explained above is as follows. This choice has the advantage that carrying out an ECC encoding on the trick play data can become an optional recording feature, or, if the ECC encoding is indeed carried out on the trick play data upon recording, ECC correction may become an optional reproduction feature. The format enables a different ECC encoding, so that, e.g., more or lesser trick play sync blocks may be required for storing the parity data. As the parity sync blocks are located at the end of each of the segments, and the numbering of parity sync blocks (90 and higher) follows the numbering of the 89 trick play sync blocks (0 to 89 inclusive) comprising the 'real' information data, the numbering of those trick play sync blocks comprising 'real' data remains unchanged and can thus be processed in the reproducing apparatus independent of whether trick play sync blocks comprising parity data are present or not, or independent of the number of how many trick play sync blocks comprising parity data are present.

Next, the trick play sync block numbering for the third trick play signal (+12× reproduction speed) will be discussed. In the time interval of one rotation of the head drum, during reproduction at the +12 times reproduction speed, the first head having the first azimuth angle scans the trick play segments 34.i(+12), where i runs from 5 to 8, and the other head scans the trick play segments 34.j( +12), where j runs from 9 to 12. The first 12 sync blocks in the segment 34.5(+12) have trick play sync block numbers running from 0 to 11 inclusive. The first 11 sync blocks in the segment 34.6(+12) have trick play sync block numbers running from 12 to 22 inclusive. The first 11 sync blocks in the segment 34.7(+12) have trick play sync block numbers running from 23 to 33 inclusive. The first 11 sync blocks in the segment 34.8(+12) have trick play sync block numbers running from 34 to 44 inclusive.

The first 12 sync blocks in the segment 34.9(+12) have trick play sync block numbers running from 45 to 56 inclusive. The first 11 sync blocks in the segment 34.10(+12) have trick play sync block numbers running from 57 to 67 inclusive. The first 11 sync blocks in the segment 34.11( +12) have trick play sync block numbers running from 68 to 78 inclusive. The first 11 sync blocks in the segment 34.12( +12) have trick play sync block numbers running from 79 to 89 inclusive.

The second 11 or 12 sync blocks, being repetitions of the first 11 or 12 sync blocks, respectively, in a segment, have the same trick play sync block numbers as the sync blocks from which they are repetitions.

The trick play sync block numbering described above is valid for all groups of eight segments 34.i(+12), where i runs from 5 to 12 inclusive, and where i runs from 13, . . . 16, 1, . . . 4. The trick play sync block numbering from 0 to 89 is thus repetitive for each rotation of the head drum in the +12 times reproduction mode.

Next, the trick play sync block numbering for the fourth trick play signal (−12× reproduction speed) will be discussed. In the time interval of one rotation of the head drum, during reproduction at the −12 times reproduction speed, the first head having the first azimuth angle scans the trick play segments 40.i(−12), where i runs from 5 to 9, and the other head scans the trick play segments 40.j(−12), where j runs from 1 to 4. The first 10 sync blocks in the segment 40.5(−12) have trick play sync block numbers running from 0 to 9 inclusive. The first 10 sync blocks in the segment 40.6(−12) have trick play sync block numbers running from 10 to 19 inclusive. The first 10 sync blocks in the segment 40.7(−12) have trick play sync block numbers running from 20 to 29 inclusive. The first 10 sync blocks in the segment 40.8(−12) have trick play sync block numbers running from 30 to 39 inclusive. The first 10 sync blocks in the segment 40.9(−12) have trick play sync block numbers running from 40 to 49 inclusive. The first 10 sync blocks in the segment 40.1(−12) have trick play sync block numbers running from 50 to 59 inclusive. The first 10 sync blocks in the segment 40.2(−12) have trick play sync block numbers running from 60 to 69 inclusive. The first 10 sync blocks in the segment 40.3(−12) have trick play sync block numbers running from 70 to 79 inclusive. The first 10 sync blocks in the segment 40.4(−12) have trick play sync block numbers running from 80 to 89 inclusive.

The second 10 sync blocks in the trick play segments, being repetitions of the first 10 sync blocks in a segment, have the same trick play sync block numbers as the sync blocks from which they are repetitions.

The trick play sync block numbering described above is valid for all groups of nine segments 40.i(−12) to 40.i+8(−12) inclusive, where i equals 1 and 10. The trick play sync block numbering from 0 to 89 is thus repetitive for each rotation of the head drum in the −12 times reproduction mode.

Next, the trick play sync block numbering for the fifth trick play signal (+24× reproduction speed) will be discussed. In the time interval of one rotation of the head drum, during reproduction at the +24 times reproduction speed, the first head having the first azimuth angle scans the trick play segments 48.i(+24), where i runs from 1 to 9, and the other head scans the trick play segments 48.j(+24), where j runs from 10 to 18. The first five sync blocks in the segment 48.1(+24) have trick play sync block numbers running from 0 to 4 inclusive. The first 5 sync blocks in the segment 48.2(+24) have trick play sync block numbers running from 5 to 9 inclusive. The first 5 sync blocks in the segment 48.3(+24) have trick play sync block numbers running from 10 to 14 inclusive. The first 5 sync blocks in the segment 48.4(+24) have trick play sync block numbers running from 15 to 19 inclusive. The first 5 sync blocks in the segment 48.5(+24) have trick play sync block numbers running from 20 to 24 inclusive. The first 5 sync blocks in the segment 48.6(+24) have trick play sync block numbers running from 25 to 29 inclusive. The first 5 sync blocks in the segment 48.7(+24) have trick play sync block numbers running from 30 to 34 inclusive. The first 5 sync blocks in the segment 48.8(+24) have trick play sync block numbers running from 35 to 39 inclusive. The first 5 sync blocks in the segment 48.9(+24) have trick play sync block numbers running from 40 to 44 inclusive. The first five sync blocks in the segment 48.10(+24) have trick play sync block numbers running from 45 to 49 inclusive. The first 5 sync blocks in the segment 48.11(+24) have trick play sync block numbers running from 50 to 54 inclusive. The first 5 sync blocks in the segment 48.12(+24) have trick play sync block numbers running from 55 to 59 inclusive. The first 5 sync blocks in the segment 48.13(+24) have trick play sync block numbers running from 60 to 64 inclusive. The first 5 sync blocks in the segment 48.14(+24) have trick play sync block numbers running from 65 to 69 inclusive. The first 5 sync blocks in the segment 48.15(+24) have trick play sync block numbers running from 70 to 74 inclusive. The first 5 sync blocks in the segment 48.16(+24) have trick play sync block numbers running from 75 to 79 inclusive. The first 5 sync blocks in the segment 48.17(+24) have trick play sync block numbers running from 80 to 84 inclusive. The first 5 sync blocks in the segment 48.18(+24) have trick play sync block numbers running from 85 to 89 inclusive.

The second group of 5 sync blocks and the third group of 5 sync blocks in the segments are repetitions of the first group of 5 sync blocks in a segment. Those sync blocks have the same trick play sync block numbers as the sync blocks in the first group from which they are repetitions.

The trick play sync block numbering described above is valid for all groups of 18 segments 48.i(+24) in a group of 48 tracks, where i runs from 1 to 18. The trick play sync block numbering from 0 to 89 is thus repetitive for each rotation of the head drum in the +24 times reproduction mode.

Next, the trick play sync block numbering for the sixth trick play signal (−24× reproduction speed) will be discussed. In the time interval of one rotation of the head drum, during reproduction at the −24 times reproduction speed, the first head having the first azimuth angle scans the trick play segments 54.i(−24), where i runs from 9 to 18, and the other head scans the trick play segments 54.j(−24), where j runs from 1 to 8. The first five sync blocks in the segment 54.9(−24) have trick play sync block numbers running from 0 to 4 inclusive. The first 5 sync blocks in the segment 54.10(−24) have trick play sync block numbers running from 5 to 9 inclusive. The first 5 sync blocks in the segment 54.11(−24) have trick play sync block numbers running from 10 to 14 inclusive. The first 5 sync blocks in the segment 54.12(−24) have trick play sync block numbers running from 15 to 19 inclusive. The first 5 sync blocks in the segment 54.13(−24) have trick play sync block numbers running from 20 to 24 inclusive. The first 5 sync blocks in the segment 54.14(−24) have trick play sync block numbers running from 25 to 29 inclusive. The first 5 sync blocks in the segment 54.15(−24) have trick play sync block numbers running from 30 to 34 inclusive. The first 5 sync blocks in the segment 54.16(−24) have trick play sync block numbers running from 35 to 39 inclusive. The first 5 sync blocks in the segment 54.17(−24) have trick play sync block numbers running from 40 to 44 inclusive. The first five sync blocks in the segment 54.18(−24) have trick play sync block numbers running from 45 to 49 inclusive. The first 5 sync blocks in the segment 54.1(−24) have trick play sync block numbers running from 50 to 54 inclusive. The first 5 sync blocks in the segment 54.2(−24) have trick play sync block numbers running from 55 to 59 inclusive. The first 5 sync blocks in the segment 54.3(−24) have trick play sync block numbers running from 60 to 64 inclusive. The first 5 sync blocks in the segment 54.4(−24) have trick play sync block numbers running from 65 to 69 inclusive. The first 5 sync blocks in the segment 54.5(−24) have trick play sync block numbers running from 70 to 74 inclusive. The first 5 sync blocks in the segment 54.6(−24) have trick play sync block numbers running from 75 to 79 inclusive. The first 5 sync blocks in the segment 54.7(−24) have trick play sync block numbers running from 80 to 84 inclusive. The first 5 sync blocks in the segment 54.8(−24) have trick play sync block numbers running from 85 to 89 inclusive.

The second and third groups of 5 sync blocks in the segments are repetitions of the first group of 5 sync blocks in a segment. The sync blocks in those second and third groups have the same trick play sync block numbers as the sync blocks in the first group from which they are repetitions.

The trick play sync block numbering described above is valid for all groups of 18 segments 54.i(−24) in a group of 48 tracks, where i runs from 1 to 18. The trick play sync block numbering from 0 to 89 is thus repetitive for each rotation of the head drum in the −24 times reproduction mode.

The trick play sync block numbers 0 to 99 require a 7-bit count word, denoted TPSB#. During a scan of the record carrier by one of the read heads in a trick play reproduction mode, at maximum 55 trick play sync blocks are read. So, when taken into account the head that is in reproducing contact with the record carrier, one could use a 6-bit count word RSB# as the sync block number of the trick play sync blocks, and thereby saving one bit during storage of the trick play sync blocks on the record carrier.

The 7-bit trick play sync block numbers TPSB# can be converted in the following way into the 6-bit numbers RSB#:

1.1 RSB# equals the 6 least significant bits of TPSB#, when the trick play sync block number is smaller than 50 and the corresponding trick play sync block is written by the first head, having the first azimuth angle.

1.2 Otherwise, RSB# equals the 6 least significant bits of (TPSB#−40).

Reconversion into the trick play sync block number upon reproduction in a trick play mode is realized in the following way:

2.1 The 6 least significant bits of TPSB# equal RSB#, when the RSB# is smaller than 50 and the corresponding trick play sync block is read by the first head, having the first azimuth angle. The 7th bit of TPSB# is then taken '0'.

2.2 Otherwise, TPSB#=RSB#+40.

Next follows a table showing the trick play sync block numbers TPSB# for the +4× trick play reproduction mode, where the head having the first azimuth reads the trick play sync blocks numbered 0 to 49 inclusive, and 90 to 94 inclusive, during one scan, and the head having the second azimuth reads the trick play sync blocks numbered 45 to 89 inclusive and 95 to 99 inclusive.

| TPSB#       | TP data SB's | TP parity SB's |
|-------------|--------------|----------------|
| 1st azimuth | 0 . . . 49   | 90 . . . 94    |
| 2nd azimuth | 45 . . . 89  | 95 . . . 99    |

Upon conversion, as explained above, the RSB# are as follows:

| RSB#        | TP data SB's | TP parity SB's |
|-------------|--------------|----------------|
| 1st azimuth | 0 . . . 49   | 50 . . . 54    |
| 2nd azimuth | 5 . . . 49   | 55 . . . 59    |

As can be seen from the second table, the value '40' given in the formula under point 1.2 above, cannot be a higher value, as in such cases, the RSB# for the trick play parity sync blocks would become smaller than 50, and thus trick play sync blocks read by the head having the first azimuth would have equal sync block numbers, which is unacceptable. Further, the value to be subtracted from TPSB# cannot be smaller than 36, as, in this case the RSB# for the trick play parity sync blocks read by the second azimuth head would run from 59 to 63. 63 is the highest number than can be represented by the 6-bit RSB word.

Next, the format of the trick play sync blocks will be discussed with reference to FIG. 8. A trick play sync block has the same length as the other sync blocks in the main data area 12 of FIG. 1, in which the first digital information signal is stored. A trick play sync block is 112 bytes long and comprises a sync word of 2 bytes long, an identification portion 60, denoted ID, a header portion 61, denoted 'main header', an aux byte 62, denoted 'data-aux' and a data area 64, which is 104 bytes long. The data area 64 has room for storage of 96 bytes of data of a trick play signal (one of the second to seventh information signals) and 8 parity bytes.

Figure 8:
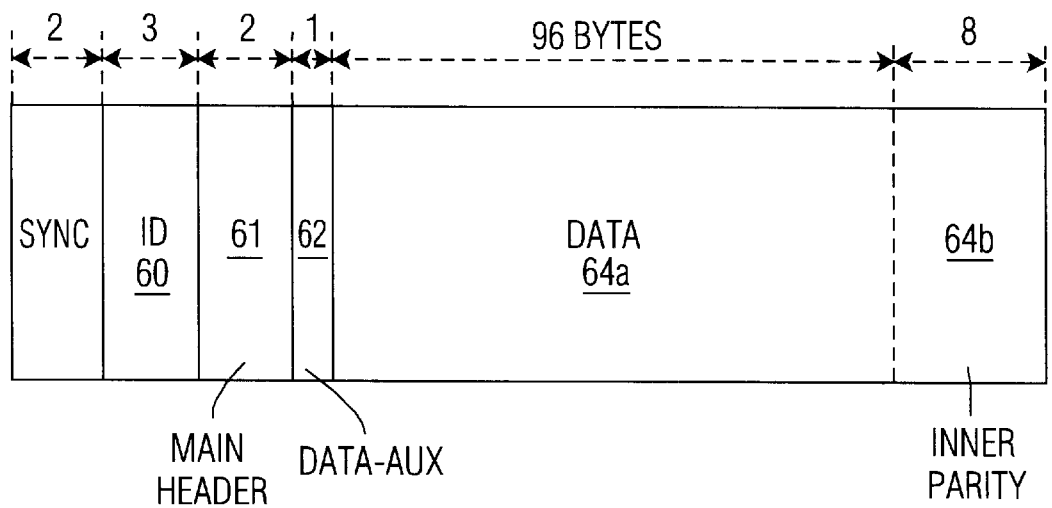
FIG. 8 shows the format of a sync block.
Figure 9:
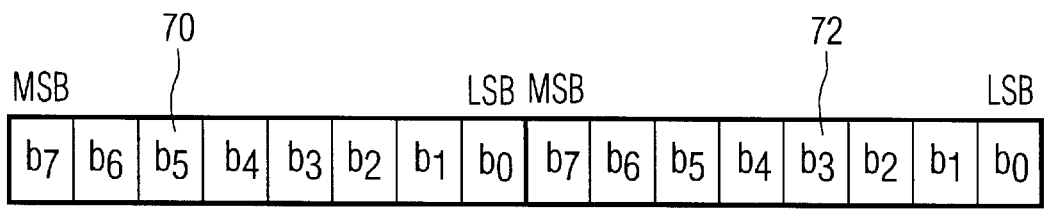
FIG. 9 shows the format of the data header portion in the sync block of FIG. 8.

FIG. 9 shows the two bytes 70 and 71 of the main header area 61 of FIG. 8. Only six bits, that is: the bits $b_0$ to $b_5$ of the byte 72 of the main header area 61, are available for storing a trick play sync block number TPSB#, although the TPSB# is expressed as a 7-bit number. The 6-bit number that can be stored in the six bits $b_0$ to $b_5$ of the byte 72 is denoted as RSB#.

Further, a trick play speed identifier is stored in the trick play sync blocks. The trick play speed identifier identifies the trick play speeds ±4×, ±12× and ±24×. A 2-bit word suffices for such identification. This 2-bit trick play speed identifier word is stored in the two remaining bits $b_6$ and $b_7$ of the byte 72 in FIG. 9. In addition, a direction identifier needs to be stored in the trick play sync blocks in order to identify a trick play block for a trick play speed identified by the 2-bit trick play speed identifier as being a trick play sync block for the said speed in the forward or the backwards direction. The byte 70, see FIG. 9, in the main header area 61, see FIG. 8, can be used for storing the direction identifier. More specifically, the 2-bit word $b_3,b_2$ comprises the direction identifier, such that the 2-bit word '10' means that the trick play sync block is meant for a trick play speed in the forward direction, while the 2-bit word '11' means that the trick play sync block is meant for a trick play speed in the reverse direction. In addition, it should be noted that the bits $b_3,b_2$='00' in byte 70 means that the sync block is a sync block comprising 'normal play' data.

Normal play sync blocks as well as trick play sync blocks may comprise dummy data. That means that the data area 64 of such sync blocks comprise useless information for the trick play speed for which the trick play sync block is meant. The 2-bit word $b_3,b_2$ of the byte 70, when being equal to '01', means that the sync block in question comprise dummy data. For such dummy data sync block, it is thus not possible to store the direction identifier at that same position in the byte 70. In that situation. the two bits $b_0$ and $b_1$ of the byte 70 are used. More specifically, when the bits $b_3$, $b_2$ equal '01'(dummy data), the bits $b_0,b_1$ have the following meaning:

$b_1,b_0$='00', means dummy data for 'normal play'.
$b_1,b_0$='01', means dummy data for trick play forward.
$b_1,b_0$='10', means dummy data for trick play reverse.

It will be evident that other 2-bit words could have been used as an alternative. For instance, $b_1,b_0$='10' could have meant dummy data for trick play forward and '01' could have meant dummy data trick play reverse.

A further feature that should be discussed is the time stamping of trick play sync blocks. Time stamping is well known in the art. Reference is made in this respect to U.S. Pat. No. 5,579,183, document D1 in the list of related documents, and international application WO 96/30.905, document D2 in the list of related documents. The documents describe the recording of MPEG packets on a record carrier, where time stamps are added to an MPEG packet upon arrival and the packet is subsequently recorded. Upon reproduction, the packet is read from the record carrier, the time stamp is retrieved from the packet and used for supplying the packet at the right moment to an output.

Figure 10:
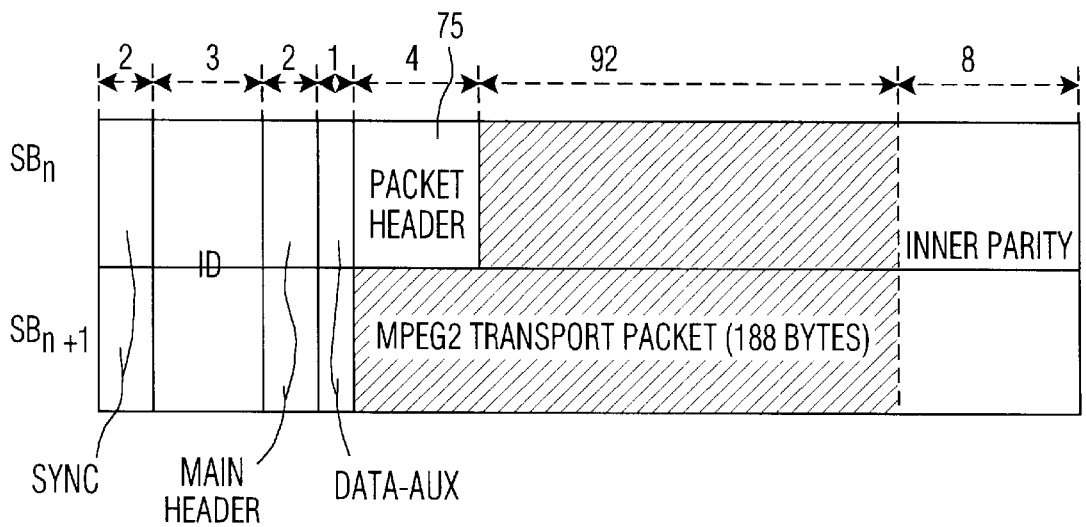
FIG. 10 shows two subsequent sync blocks in which an MPEG packet is stored.

FIG. 10 shows how an MPEG transport packet, which is 188 bytes long, is stored in two subsequent sync blocks, more specifically, in the data area 64a of two subsequent sync blocks. First, a packet header 75, which is 4 bytes long, is stored in the data area 64a of the first of the two sync blocks, denoted $SB_n$. Next, 92 bytes of the MPEG packet are stored in the remaining portion of the data area 64a of sync block $SB_n$. The remaining 96 bytes of the MPEG packet are stored in the data area 64a of the second sync block $SB_{n+1}$.

Figure 11:
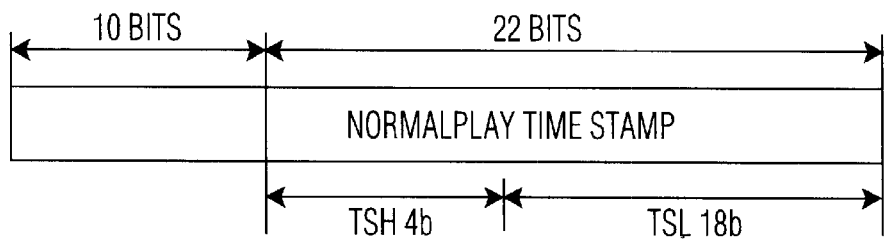
FIG. 11 shows the contents of the packet header in the first of the two subsequent sync blocks of FIG. 10, this packet header including the time stamps.

The time stamp corresponding to a transport packet is stored in the packet header 75. This is shown in FIG. 11. More precisely, the time stamp for 'normal play' data is 22 bits long and is stored in the last 22 bits of the packet header 75.

The 22-bit time stamp for the 'normal play' data has been divided into a TSL (time stamp low) portion and a TSH (time stamp high) portion. The TSL portion is 18 bits long and runs cyclically with a modulo value of 225,000, for an apparatus in which the head drum rotates with 1800 rpm, or with a modulo value of 225,225, for an apparatus in which the head drum rotates with 1800/1.001 rpm. The TSH portion is 4 bits long and runs cyclically with a modulo value of 12. Upon each return to 0 for TSL, the TSH value is increased by one.

A time stamp counter is available in the recording apparatus to be described later. For the generation of time stamps for the MPEG packets for a 'normal play' information signal, the time stamp counter has a period equal to six revolutions of the head drum. The time stamp counter generates, in the present example, the 22-bit time stamps in the form of count words with a clock frequency of 27 MHz.

Trick play information for a specific trick play speed can be obtained from an MPEG data stream by retrieving packets comprising I-frames, well known in the art, from the MPEG data stream, and storing those packets in the trick play sync blocks.

A time stamp counter, which can be the same counter as mentioned above, is available for the generation of time stamps for the MPEG packets for a trick play information signal. This time stamp counter has a period equal to one revolution of the head drum. The time stamp counter generates, in the present example, 20-bit count words with a clock frequency of 27 MHz. The time stamp for the trick play data is again made up of an 18-bit TSL (time stamp low) portion, identical to the TSL portion described above for the normal play time stamps, and a TSH' (time stamp high) portion. TSL runs cyclically with a modulo value of 225, 000, for an apparatus in which the head drum rotates with 1800 rpm, or with a modulo value of 225,225, for an apparatus in which the head drum rotates with 1800/1.001 rpm. The TSH' portion is 2 bits long and runs cyclically with a modulo value of 4. Upon each return to 0 for TSL, the TSH' value is increased by one. As a result, the period of TSL equals one quarter of a rotation of the head drum and the trick play time stamp counter is periodic with the one revolution of the head drum. The time stamp counter is synchronized with the head switch pulse, normally present in the apparatus.

Figure 12:
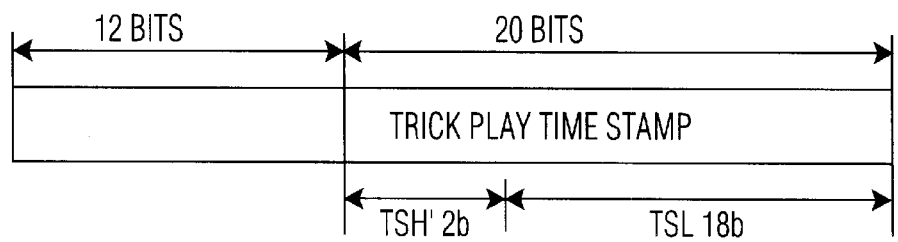
FIG. 12 shows the contents of the packet header in the first of the two subsequent trick play sync blocks of FIG. 10, this packet header comprise the time stamps for packets in a trick play data stream of packets.

The 20-bit time stamp is stored in the packet header 75 of the first of two subsequent trick play sync blocks in which the MPEG packet corresponding to this time stamp is stored, see FIG. 12.

A transport packet for storing in two subsequent trick play sync blocks thus has a time stamp, and the two subsequent trick play sync blocks in which the transport packet is stored have corresponding trick play sync block numbers that relate to the position in the tracks where those trick play sync blocks are recorded.

From the time stamp added to the transport packet, a nominal trick play sync block number for the two trick play sync blocks in which the transport packet is stored can be derived, using the following equation:

$$NTPSB\# = \text{int}[(k+n/N).90/4],$$

where NTPSB# is the nominal trick play sync block number, N is a constant which equals 225,000 in a recording apparatus in which the rotating head drum rotates with 1800 rpm and equals 225,225 in a recording apparatus in which the rotating head drum rotates with 1800/1.001 rpm, n equals the decimal value of TSL and k is the decimal value of TSH'.

Next, the two subsequent trick play sync blocks are recorded in specific positions in one or two tracks on the record carrier. Those positions correspond to the actual trick play sync block numbers, denoted ATPSB#, stored in those trick play sync blocks.

The relation between the actual trick play sync block number ATPSB# of a trick play sync block and the nominal trick play sync block number NTPSB# derived for that block is now as follows:

$$NTPSB\#-45 < ATPSB\# < NTPSB\#+45.$$

In this way, it is guaranteed that the position where a trick play sync block including part of a trick play packet is recorded in the tracks on the record carrier during one revolution of the head drum is not too far away from the position where it optimally should have been recorded, so that the buffer memory for storing the packets read from the record carrier upon reproduction need not be too large. The above formula makes clear that a trick play sync block comprising part of a trick play packet is recorded in the same track as the nominal position or in a track earlier or later. But, even when recorded in an earlier or a later track, it is assured that the trick play block is shifted back to its correct position, viewed in time, upon reproduction.

The formula given above is valid for all the trick play information signals recorded on the record carrier, where it should be noted that, when ATPSB# is chosen smaller than 0, this means that the trick play sync block having the trick play sync block number ATPSB#+90 is recorded during the previous revolution of the head drum, while, when ATPSB# is chosen larger than 89, this means that the trick play sync block having the trick play sync block number ATPSB-90 is recorded during the subsequent revolution of the head drum.

Figure 13:
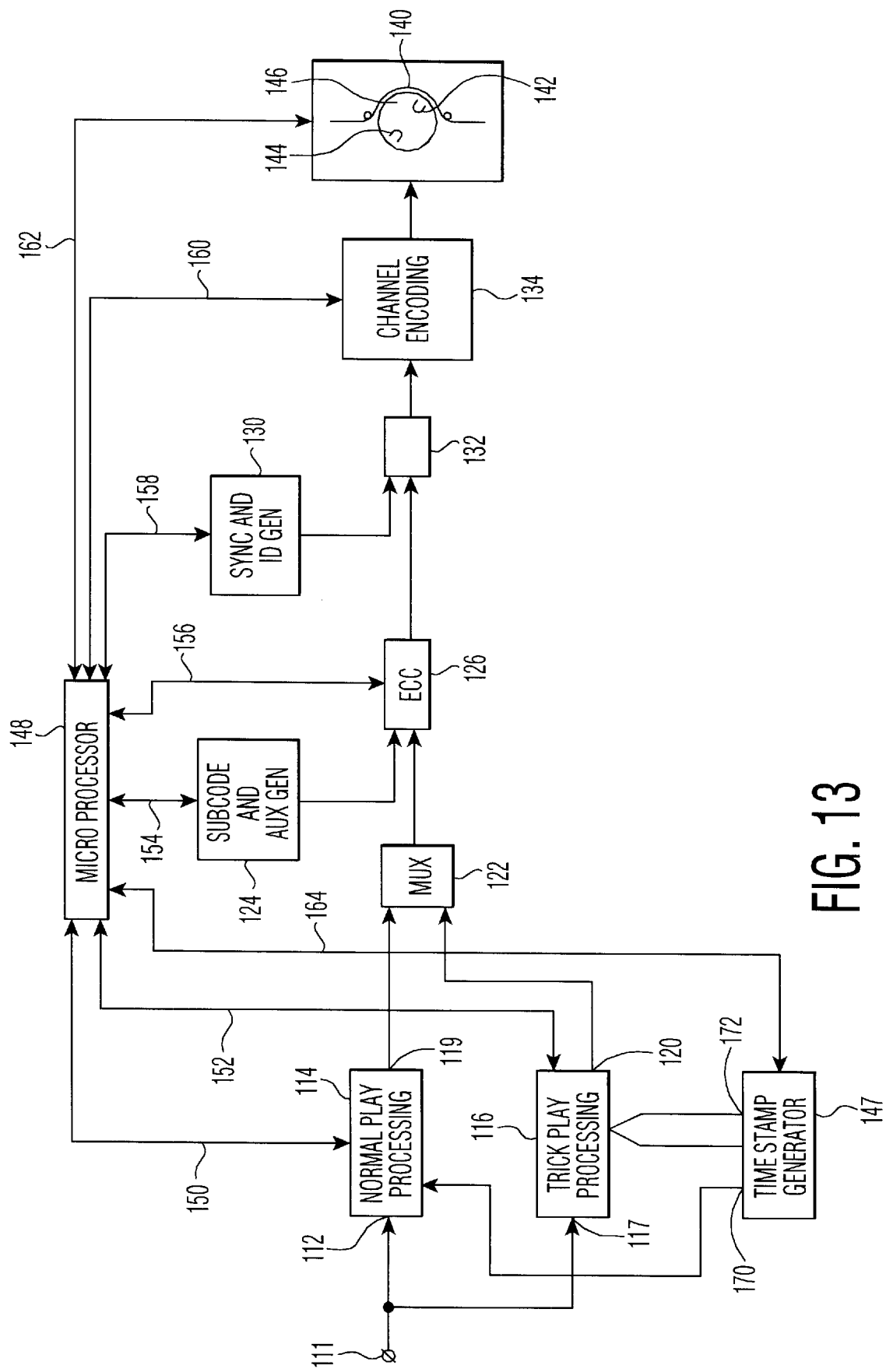
FIG. 13 shows an embodiment of a recording apparatus in accordance with the invention.

Next, an apparatus of the helical scan type, for recording the trick play information on a longitudinal record carrier, is described. FIG. 13 shows the recording apparatus which comprises an input terminal 111 for receiving a video signal and a corresponding audio signal. The video signal and the corresponding audio signal may have been encoded into transport packets included in an MPEG serial datastream, well known in the art. The input terminal 111 is coupled to an input 112 of a 'normal play' processing unit 114. Further, a 'trick play' processing unit 116 is provided having an input 117 also coupled to the input terminal 111. Outputs 119 and 120 of the 'normal play' processing unit 114 and the 'trick play' processing unit 116 are coupled to corresponding inputs of a multiplexer 122. The 'normal play' information as well as the 'trick play' information will be recorded in the main area recording portion 12 of the track shown in FIG. 2.

For a further description of the 'normal play' processing unit 114 and the 'trick play' processing unit 116, reference is made to U.S. Pat. No. 5,579,183, document D1 in the list of related documents.

A subcode and auxiliary signal generator 124 is present for supplying the subcode signal information for storage in the subcode signal recording portion 4, and for supplying the auxiliary signal for storage in the auxiliary signal recording portion 8, see FIG. 2. Outputs of the multiplexer 122 and the generator 124 are coupled to corresponding inputs of an error correction encoder unit 126. The error correction encoder unit 126 is capable of carrying out a error correction encoding step on the 'normal play' (video and audio) information and the trick play information, so as to obtain the parity information shown in the portion 12b of the main signal recording portion 12 in FIG. 2, and in the portions 64b of the sync blocks, see FIGS. 8 and 10.

The recording apparatus further comprises a generator 130 for adding the sync and ID information for the sync blocks, such as shown in FIG. 8. After combination of the signals in the combining unit 132, the combined signal is applied to a unit 134, in which a channel encoding is carried out on the composite signal. The channel encoding carried out in the encoding unit 134 is well known in the art. For an example of such channel coding, reference is made in this respect to U.S. Pat. No. 5,142,421, document D 3 in the list of references.

An output of the channel encoding unit 134 is coupled to an input of a writing unit 136, in which the datastream obtained with the encoding unit 134 is recorded in the slant tracks on a record carrier 140, by means of at least two write heads 142 and 144 positioned on a rotating head drum 146. The write heads 142 and 144 have head gaps with a mutually different azimuth angle, so that (e.g.) the head 142 write the tracks having an azimuth angle from bottom left to top right in FIG. 1 and the head 144 writes the tracks having an azimuth angle from top left to bottom right in FIG. 1. Further, a time stamp generator 147 is available for generating time stamps for the normal play processing unit 114 and the trick play processing unit 116.

A microprocessor unit 148 is present for controlling the functioning of the various blocks, such as:
- the control of the normal play signal processing block 114 via the control connection 150,
- the control of the trick play signal processing block 116 via the control connection 152,
- the control of the subcode signal and auxiliary signal generator block 124 via the control connection 154,
- the control of the error correction encoding block 126 via the control connection 156,
- the control of the sync signal and ID signal generator block 130 via the control connection 158,
- the control of the channel encoding block 134 via the control connection 160,
- the control of the transport velocity of the record carrier 140 and the rotation of the head drum 146, via the control connection 162, and
- the control of the time stamp generator 147 via the control connection 164.

The trick play processing 116 is adapted to retrieve I-frame information from the first information signal, in a way well known in the art. An additional error correction encoding step is carried out in the processing unit 116 on the trick play information in order to generate the 10 trick play sync blocks comprising the parity information for the +4× and −4× trick play speed. Further, repetitions of trick play sync blocks are generated for the +12×, −12×, +24× and −24× trick play information signals.

Further, for each trick play information signal, trick play sync blocks are generated, in the sense that for each trick play sync block the trick play speed identifier and the direction identifier are generated and stored in the trick play sync block at the location described above. Also, a trick play sync block number ATPSB# is generated in the way described above and stored in the trick play sync block, and a time stamp is added to each packet in the various trick play information signals.

Next, the trick play sync blocks and the 'normal play' sync blocks, generated by the normal play signal processing unit 114, are combined in the multiplexer unit 122, such that, for recording information in one complete track by one of the heads, the sequence of sync blocks of the normal play information and the trick play information is such that the main data area 12 of one of the 48 tracks shown in FIG. 1 can be created.

Subcode data and auxiliary data is added and an error correction encoding is carried out on the combined normal play data and trick play data so as to obtain the parity information for the track portion 12b. Further, sync words and identification information is added. Next, a channel encoding step is carried out on the information prior to recording the information in the tracks.

It should be noted that, upon recording groups of 48 subsequent tracks, two tracks in each group, that are the first and the last one shown in FIG. 1, are devoid of any trick play segments. This enables the possibility to realize editing, where the edit points can be chosen exactly at the location of the two tracks that have no trick play segments recorded in them.

An embodiment of the time stamp generator unit 147 will be described hereafter. It is known in the art, see WO 96/30.905-A2, document D2, to provide the time stamp generator unit 147 with an oscillator that is locked to the program clock reference (PCR) included in the MPEG packets, which oscillator supplies count pulses with a 27 MHz frequency to a counter.

Figure 14:
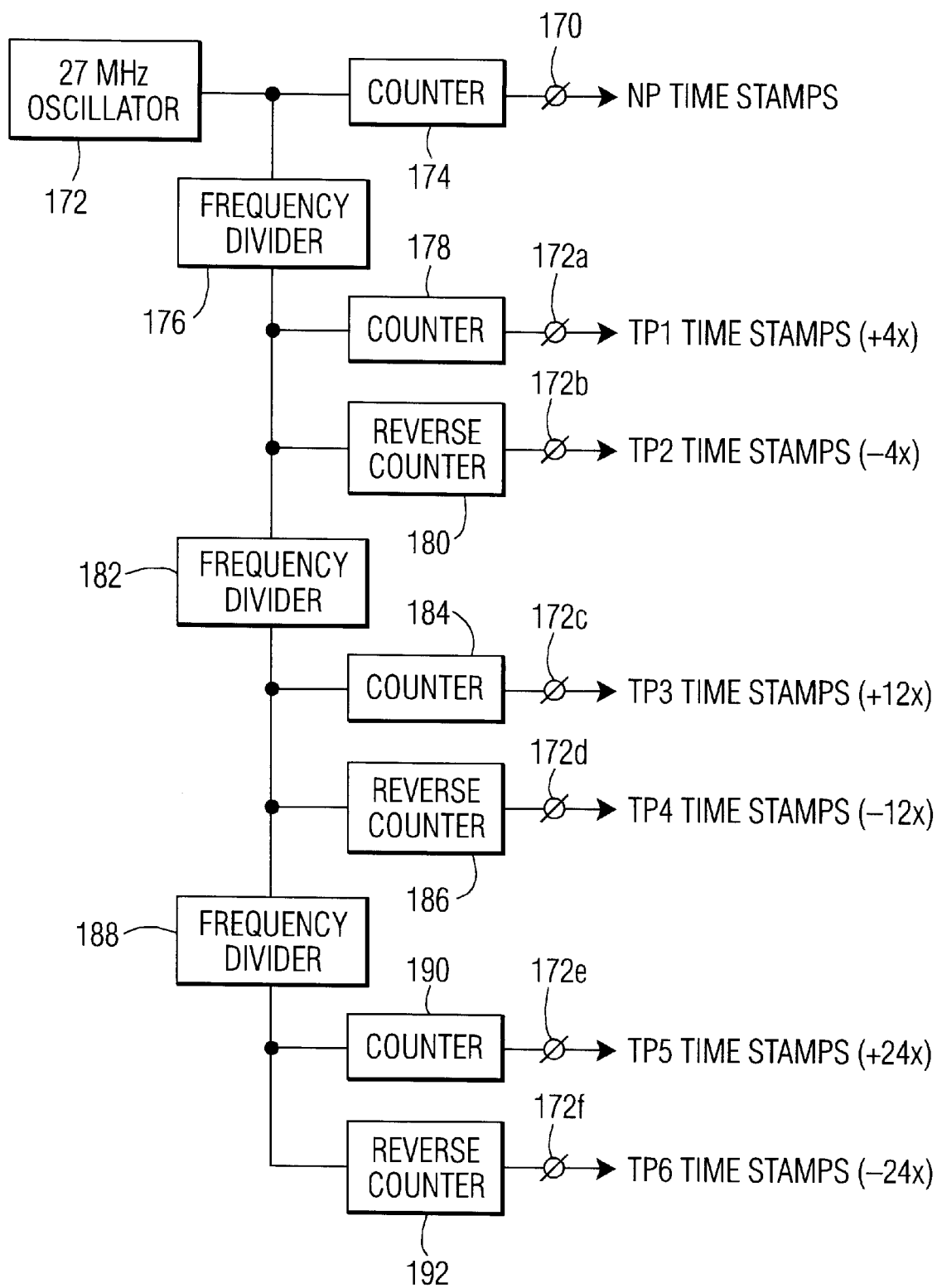
FIG. 14 shows an embodiment of a time stamp generator in the apparatus of FIG. 13.

FIG. 14 shows an embodiment of the time stamp generator 147 provided with a 27 MHz oscillator 172, which supplies 27 MHz clock pulses to a counter 174. In response to this, the counter 174 generates 'normal play' (NP) time stamps at a rate of 27 MHz to an output 170, for supply to the normal play processing unit 114. The 27 MHz clock pulses are also supplied to a frequency divider 176, which divides the clock frequency by 4. The value 4 relates to the ratio of the first trick play speed (4×) to the nominal speed (1×). The clock pulses, divided by 4 in frequency, are supplied to a counter 178, to a reverse counter 180 and to another frequency divider 182. The counter 178 supplies the trick play (TP1) time stamps for the first trick play information signal, which is the trick play signal for a reproduction speed of +4 times the nominal speed and supplies the TP1 time stamps via the output 172a to the trick play processing unit 116. The reverse counter 180 supplies the trick play (TP2) time stamps for the second trick play information signal, which is the trick play signal for a reproduction speed of −4 times the nominal speed and supplies the TP2 time stamps via the output 172b to the trick play processing unit 116.

The reason for the frequency division by a factor of 4 in the frequency divider 176 is the following. Suppose that the NP time stamps from the counter 174 would have been used for time stamping the packets for the first trick play signal. Upon reproduction at a speed 4 times the nominal speed, those packets would come with a speed 4 times higher. By dividing the frequency of generation of the time stamps by four, as in the frequency divider 176, and using those time stamps for time stamping the packets of the first trick play signal, the correct timing for the packets of the trick play signal upon reproduction in the trick play mode can be regained. Further, in order to obtain the correct timing upon reproduction of the −4 times trick play signal, it is required to reverse the order of generation of the time stamps as a function of time. This is realized by reversing the count values in the reverse counter 180.

The frequency of the clock pulses supplied by the frequency divider 176 to the frequency divider 182 is now divided by 3 in the frequency divider 182. The value 3 relates to the ratio of the second trick play speed (12×) to the first trick play speed (4×). The clock pulses, divided by 3 in frequency, are supplied to a counter 184, to a reverse counter 186 and to another frequency divider 188. The counter 184 supplies the trick play (TP3) time stamps for the third trick play information signal, which is the trick play signal for a reproduction speed of +12 times the nominal speed and supplies the TP3 time stamps via the output 172c to the trick play processing unit 116. The reverse counter 186 supplies the trick play (TP4) time stamps for the fourth trick play information signal, which is the trick play signal for a reproduction speed of −12 times the nominal speed and supplies the TP4 time stamps via the output 172d to the trick play processing unit 116.

The frequency of the clock pulses supplied by the frequency divider 182 to the frequency divider 188 is now divided by 2 in the frequency divider 188. The value 2 relates to the ratio of the third trick play speed (24×) to the second trick play speed (12×). The clock pulses, divided by 2 in frequency, are supplied to a counter 190 and to a reverse counter 192. The counter 190 supplies the trick play (TP5) time stamps for the fifth trick play information signal, which is the trick play signal for a reproduction speed of +24 times the nominal speed and supplies the TP5 time stamps via the output 172e to the trick play processing unit 116. The reverse counter 192 supplies the trick play (TP6) time stamps for the sixth trick play information signal, which is the trick play signal for a reproduction speed of −24 times the nominal speed and supplies the TP6 time stamps via the output 172f to the trick play processing unit 116.

Figure 15:
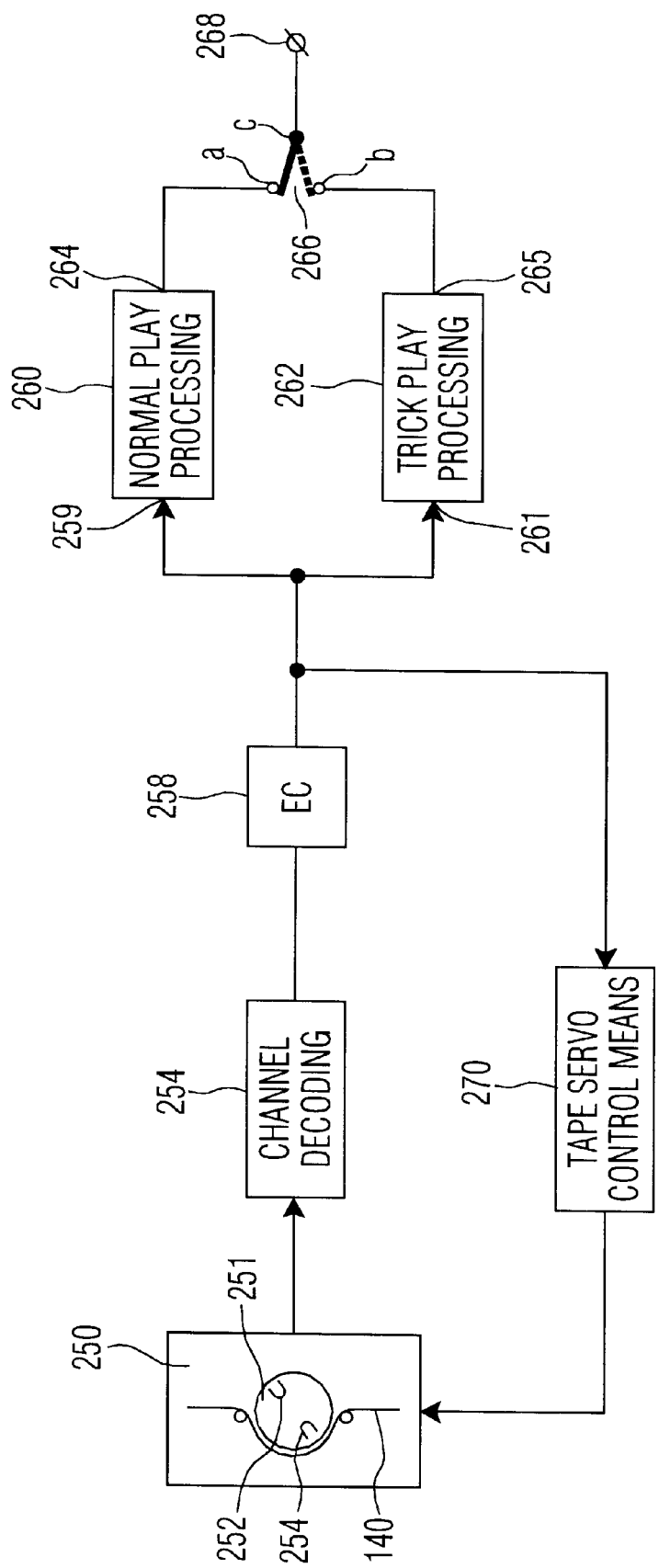
FIG. 15 shows an embodiment of a reproduction apparatus.

FIG. 15 shows schematically, an embodiment of a reproduction apparatus for reproducing information from the record carrier 140 obtained with the recording apparatus of FIG. 13. The reproduction apparatus comprises a reading unit 250, having at least two reading heads 252 and 254, for reading information from the slant tracks on the record carrier 140. The one read head 252 has a gap with an azimuth angle which equals the azimuth angle of the write head 142 and the other read head 254 has a gap with an azimuth angle which equals the azimuth angle of the write head 144. An output of the reading unit 250 is coupled to an input of a channel decoding unit 254. The channel decoding unit may be adapted to carry out a 25-to-24 decoding on the signal read out, so as to convert 25-bit words in the incoming datastream into 24-bit words, such as disclosed in U.S. Pat. No. 5,142,421, document D3. Next, an error correction is carried out in the error correction unit 258.

The error correction unit 258 is used for carrying out an error correction on the information read from the record carrier in the 'normal play' reproduction mode, on the basis of the parity information read from the portions 12b of the tracks, see FIG. 2, and the parity information stored in the portions 64b of the sync blocks, see FIG. 8. In a trick play reproduction mode, only an error correction based on the parity information stored in the portions 64b of the trick play sync blocks is (can be) carried out.

The output of the error correction unit 258 is coupled to an input 259 of a 'normal play' processing unit 260. Further, a 'trick play' processing unit 262 is provided having an input 261 also coupled to the output of the error correction unit 258. Outputs 264 and 265 of the 'normal play' processing unit 260 and the 'trick play' processing unit 262 respectively, are coupled to corresponding terminals a and b respectively of a switch 266, a c-terminal of which is coupled to an output terminal 268.

If the reproducing apparatus is switched into a 'normal play' reproduction mode, this means that the record carrier 140 is transported at a nominal speed, that the 'normal play' processing unit 260 is enabled, and the switch 266 is switched into the position a–c. If the reproducing apparatus is switched into a 'trick play' reproduction mode, also called 'feature mode', this means that the record carrier 140 is transported at a speed other than the nominal speed, that the 'trick play' processing unit 262 is enabled and the switch 266 is switched into the position b–c.

For enabling a 'trick play' reproduction mode, the reproducing apparatus is further provided with a tape servo control means 270 which generates a control signal for controlling the speed of the record carrier 140. More specifically, the control means 270 generates a control signal during the 'trick play' reproduction mode for transporting the record carrier 140 such that, in the first trick play mode with the record carrier speed being +4 times the nominal reproduction speed, in accordance with FIG. 1, the head 252 exactly crosses the tracks in accordance with the lines 24.1 and 24.2, and the head 254 exactly crosses the tracks in accordance with the lines 26.1 and 26.2 in FIG. 1.

In the second trick play reproduction mode, with the record carrier speed being –4 times the nominal reproduction speed, the control means 270 generates a control signal such that, in accordance with FIG. 3, the head 252 exactly crosses the tracks in accordance with the lines 30.1 and 30.2, and the head 254 exactly crosses the tracks in accordance with the lines 32.1 and 32.2 in FIG. 3.

In the third trick play reproduction mode, with the record carrier speed being +12 times the nominal reproduction speed, the control means 270 generates a control signal such that, in accordance with FIG. 4, the head 252 exactly crosses the tracks in accordance with the lines 37.1 and 37.2, and the head 254 exactly crosses the tracks in accordance with the lines 36.1 and 36.2 in FIG. 4.

In the fourth trick play reproduction mode, with the record carrier speed being 12 times the nominal reproduction speed, the control means 270 generates a control signal such that, in accordance with FIG. 5, the head 252 exactly crosses the tracks in accordance with the line 42, and the head 254 exactly crosses the tracks in accordance with the line 44 in FIG. 5.

In the fifth trick play reproduction mode, with the record carrier speed being +24 times the nominal reproduction speed, the control means 270 generates a control signal such that, in accordance with FIG. 6, the head 252 exactly crosses the tracks in accordance with the line 50, and the head 254 exactly crosses the tracks in accordance with the line 51 in FIG. 6.

In the sixth trick play reproduction mode, with the record carrier speed being 24 times the nominal reproduction speed, the control means 270 generates a control signal such that, in accordance with FIG. 7, the head 252 exactly crosses the tracks in accordance with the line 56, and the head 254 exactly crosses the tracks in accordance with the line 58 in FIG. 7.

The record carrier transport control realized in the way explained above is named: track select transport control, in the sense that specific paths across the record carrier are selected for reproduction in a trick play reproduction mode, said paths beginning at specific tracks on the record carrier. Further, those paths are chosen such that at least one of the two read heads is capable of reading the subcode information recorded in the recording portions 4 of the tracks. In FIG. 1, this is the head following the paths 24.1 and 24.2. The head following the paths 26.1 and 26.2 is not capable of reading the subcode recording portions 4, as it scans the subcode recording portions of tracks having the wrong azimuth. In FIG. 3, this is the head following the paths 30.1 and 30.2. The head following the paths 32.1 and 32.2 is not capable of reading the subcode recording portions 4, as it scans the subcode recording portions of tracks having the wrong azimuth. In FIG. 4, this is the head following the paths 37.1 and 37.2. The head following the paths 36.1 and 36.2 is not capable of reading the subcode recording portions 4, as it scans the subcode recording portions of tracks having the wrong azimuth. In FIG. 5, this is the head following the path 42. The head following the path 44 is not capable of reading the subcode recording portions 4, as it scans the subcode recording portions of tracks having the wrong azimuth. In FIG. 6, this is the head following the path 50. The head following the path 51 is not capable of reading the subcode recording portions 4, as it scans the subcode recording portions of tracks having the wrong azimuth. In FIG. 7, this is the head following the path 58. The head following the path 56 is not capable of reading the subcode recording portions 4, as it scans the subcode recording portions of tracks having the wrong azimuth.

The reproduction in a trick play reproduction mode will now be explained in more detail. During trick play reproduction, bursts of information of 'normal play' data and bursts of information of 'trick play' data are read by the two heads during one revolution of the head drum. Not complete 'normal play' data is ignored and, as far as complete 'normal play' sync blocks are read, those sync blocks are identified by their identifier (the bits $b_3, b_2$ in byte 70 equal '00', see FIG. 9), as being 'normal play' data, and thus also ignored.

As soon as a sync block is read, having a trick play speed identifier which is stored in the two remaining bits $b_7, b_6$ of the byte 72 in FIG. 9, which corresponds to the trick play reproduction speed in question, and further, the direction identifier identifies a trick play speed in the forward direction (the bits $b_3, b_2$ of the byte 72 in FIG. 9 being equal to '10'), the sync block read is detected as being a trick play sync block for the +12 times nominal reproduction mode and stored in the trick play processing unit 262 for further processing.

For the +4 times reproduction speed, as well as the –4 times reproduction speed, the parity data read from the record carrier during one revolution of the head drum, is used to carry out an ECC on the trick play data retrieved from the record carrier during that same revolution of the head drum. For the other trick play reproduction speeds, the repetitions of the trick play sync blocks are used to carry out an error correction on the reproduced data.

The trick play sync block numbers for each of the trick play sync blocks can be derived from the RSB# stored in the 6 bits $b_0$ to $b_5$ of the byte 72, in the way as explained above, using the knowledge about which head is in reproducing contact with the record carrier. When having derived the trick play sync block numbers, those numbers are used to store the trick play sync blocks in specific memory locations in a processing memory included in the processing unit 262.

It should be noted here that the use of the trick play sync block numbers is preferred over the use of the sync block numbers for storing the trick play sync blocks in the processing memory. The trick play sync block numbers directly relate to the memory locations in the said processing memory in which the trick play sync blocks are to be stored. Using the sync block numbers instead, would require a conversion table to convert the sync block numbers into the corresponding trick play sync block numbers in order to store the trick play sync blocks at their correct location in the processing memory. This conversion table thus has to be stored in the reproducing apparatus. Such conversion table, however, would prevent the recording/reproducing system described from being 'forward compatible', in the sense that, if another correspondence between sync block numbers and trick play sync block numbers were chosen in a new version of the recording/reproducing system, such would make the older system and the tapes obtained with the older system useless in the new system.

Further, by using the trick play sync block numbers, the recording of the trick play sync blocks on the record carrier becomes more flexible, as a trick play sync block having a specific trick play sync block number can be stored at a variable position in a track on the record carrier. By varying this position, the sync block number will change. The trick play sync block number will not, so that upon reproduction, irrespective of where the trick play sync block is stored in the track, it will be stored at the correct location in the processing memory. In addition, no memory space is required for storing the conversion table and for carrying out the conversion.

The trick play packets can now be retrieved from each two subsequent trick play sync blocks. The time stamps for each packet of the trick play information signal are derived from the packet header 75, see FIG. 10.

In the processing unit 262, the time stamps derived from each of the packets is compared to a reference time stamps generated by a reference time stamp counter included in the processing unit 262 with a 27 MHz frequency. Upon coincidence of the value of the time stamp of a packet with the value of the time stamp generated by the reference time stamp counter, the packet is outputted at the output 265, so as to obtain a valid MPEG transport stream at the output terminal 268. An MPEG decoder may be included in the apparatus, coupled to the terminal 286, or may be separate from the apparatus.

While the invention has been described with reference to preferred embodiments thereof, it is to be understood that these are not limitative examples. Thus, various modifications may become apparent to those skilled in the art, without departing from the scope of the invention, as defined by the claims. The first information signal thus may be another type of signal than a digital video signal and/or an audio signal, such as a data signal. Further, the trick play signal recorded in the trick play segments could be an information signal which has no relationship whatsoever with the first digital information signal. In such an embodiment, the record carrier is a recording medium on which a multiplicity of transmission channels are available for transmitting independent information signals.

Further, the invention lies in each and every novel feature or combination of features.

The advantages of the recording/reproducing system described above can be summarized as follows:

1. A fixed number of trick play sync blocks are read from the record carrier during one revolution of the head drum in a trick play reproduction mode: in the present example, 90 trick play sync blocks.
2. The format obtained enables the reading of the subcode in a trick play reproduction mode.
3. As many as possible data burst are present and divided over the two scans of both heads in one revolution of the head drum.
4. The trick play segments are as short as possible so as to obtain a robust trick play reproduction.
5. The format is repetitive in groups of (p=) 48 tracks and is chosen such that editing can be realized, for the reason that at least one of the tracks in the group of 48 tracks is devoid of trick play information.
6. An optimal position of the segments with respect to the ideal scanning line of a reproduction head can be obtained.
7. An optimal robustness against tracking errors and missing trick play sync blocks is obtained.

It should be made very well clear that the invention should not be restricted to the specific trick play reproduction speeds described in the figure description. E.g., trick play speeds 6×, 18× and 36× in forward and backwards direction could have been chosen, combined with trick play information recorded in groups of (p=) 72 tracks. Further, the invention need not be restricted to the recording of video data. One could imagine to use the invention in an audio recording system, based on the helical scan principle, where different audio signals are record in the trick play segments for the various trick play speeds.

RELATED DOCUMENTS

D1 U.S. Pat. No. 5,579,183, corresponding to EP 702,877-A2 (PHN 14.818)
D2 WO 96/30.905-A2 (PHN 15.260)
D3 U.S. Pat. No. 5,142,421 (PHN 13.537)
D4 U.S. Pat. No 5,751,889, corresponding to WO 95/28061 (PHN 14.832)

What is claimed is:

1. An apparatus for recording a first and a second digital information signal in slant tracks on a magnetic record carrier, the apparatus comprising:

input means for receiving the first and second digital information signals;

signal processing means for processing the first and second digital information signals into first and second trick play signals, respectively, suitable for recording in the slant tracks; and writing means for writing, at a recording speed of the record carriers, the first and second trick play signals to form first and second trick play segments, respectively, located at specific positions in said slant tracks, the writing means comprising at least a first and a second write head located on a rotatable head drum, the first write head having a gap with a first azimuth angle, and the second write head having a gap with a second azimuth angle which is different from the first azimuth angle, the first digital information signal enabling replay in a reproduction apparatus at a trick play reproduction speed which equals $n_1$ times the recording speed, the second digital information signal enabling replay in said reproduction apparatus at a trick play reproduction speed which equals $n_2$ times the recording speed, where $n_1$ and $n_2$ are integers unequal to each other and unequal to 0 and 1, characterized in that the first and second trick play signals comprise sync blocks of information of the first and second digital information signals, respectively, and the writing means writing the sync blocks of the first trick play signal into a plurality of the first trick play segments, and writing the sync blocks of the second trick play signal into a plurality of the second trick play segments, the sync blocks in the first and second trick play segments comprising a first and a second sync block sequence number, the first sync block sequence number in a sync block having a relationship with the position of the sync block in a slant track, and the second sync block sequence number having no such relationship with the position of the sync block in said slant track.

2. Apparatus as claimed in claim 1, characterized in that the writing means writes a plurality of first trick play segments in each of subsequent groups of p tracks so as to enable reproduction of $m_1$ sync blocks of the first trick play signal at said trick play speed $n_1$ times the recording speed in said reproduction apparatus, during one revolution of a head drum comprised in said reproduction apparatus, the reproduction apparatus comprising at least a first and a second read head located on said head drum, said first read head having a gap with an azimuth angle substantially equal to said first azimuth angle and the second read head having a gap with an azimuth angle substantially equal to said second azimuth angle, the writing means further writing a plurality of second trick play segments in each said groups of p tracks so as to enable reproduction of $m_1$ sync blocks of the second trick play signal at said trick play speed $n_2$ times the recording speed, during said one revolution of the head drum, where p is an even integer value larger than 1, and where $m_1$ is an integer larger than 1, that the second sync block sequence numbers in said $m_1$ sync blocks of the first trick play signal are equivalent to a sequence of count numbers running from a start count number $m_0$, which is zero, to a final count number $m_0+m_1-1$, and that the second sync block sequence numbers in said $m_1$ sync blocks of the second trick play signal are equivalent to said sequence of count numbers running from said start count number $m_0$, which is zero, to said final count number $m_0+m_1-1$.

3. Apparatus as claimed in claim 2, characterized in that the writing means writes said $m_1$ sync blocks of the first trick play signal into two first trick play segments, that $m_1$ is an even integer number, and that each one of the two first trick play segments comprise $m_1/2$ sync blocks of the first trick play signal.

4. Apparatus as claimed in claim 3, characterized in that $m_4$ sync blocks of the $m_1/2$ sync blocks in each of the first trick play segments comprise parity information, said $m_4$ sync blocks being devoid of any portion of the first digital information signal, the $m_1/2-m_4$ other sync blocks in one of the two first trick play segments having second sync block sequence numbers equivalent to a sequence of count numbers running from $m_0$ to $m_0+m_1/2-m_4-1$, and the $m_1/2-m_4$ other sync blocks in the other of the two first trick play segments having second sync block sequence numbers equivalent to a sequence of count numbers running from $m_0+m_1/2-m_4$ to $m_0+m_1-2.m_4-1$.

5. Apparatus as claimed in claim 4, characterized in that:
(a) the second sync block sequence numbers of the $m_4$ sync blocks, comprising parity information and included in the said one first trick play segment, are equivalent to a sequence of count numbers running from $m_0+m_1-2.m_4$ to $m_0+m_1-m_4-1$, and that
(b) the second sync block sequence numbers of the $m_4$ sync blocks, comprising parity information and included in the other first trick play segment, are equivalent to a sequence of count numbers running from $m_0+m_1-m_4$ to $m_0+m_1+_4-1$.

6. Apparatus as claimed in claim 3, characterized in that during reproduction at said trick play speed $n_1$ times the recording speed in said reproduction apparatus, said one first trick play segment, comprising the sync block having a second sync block sequence number equivalent to the count number $m_0$, is for being read as the first one of the two first trick play segments by one of the two read heads during said one revolution of the head drum, the other first trick play segment is for being read thereafter by the other of said two read heads during said revolution of the head drum.

7. Apparatus as claimed in claim 2, characterized in that the writing means writes said $m_1$ sync blocks of the second trick play signal into four second trick play segments, that each of the four second trick play segments comprises $(m_1)/4$ sync blocks of the second trick play signal, while $m_1$ is a multiple of 4.

8. Apparatus as claimed in claim 7, characterized in that $(m_4-1)/2$ sync blocks of the $m_1/4$ sync blocks in each of two of the second trick play segments comprise parity information, said $(m_4-1)/2$ sync blocks being devoid of any portion of the second digital information signal, that $(m_4+1)/2$ sync blocks of the $m_1/4$ sync blocks in each of the other two second trick play segments comprise parity information, said $(m_4+1)/2$ sync blocks being devoid of any portion of the second digital signal.

9. Apparatus as claimed in claim 8, characterized in that the other sync blocks, comprised in one of the second trick play segments, have second sync block sequence numbers that are equivalent to a sequence of count numbers that run from $m_0$ to either $m_0+m_1/4-(m_4-1)/2-1$ or to $m_0+m_1/4-(m_4+1)/2-1$, that the other sync blocks, comprised in a second one of the four second trick play segments, have second sync block sequence numbers that are equivalent to a sequence of count numbers that run from either $m_0+m_1/4-(m_4-1)/2$ or from $m_0+m_1/4-(m_4+1)/2$ to $m_0+m_1/2-m_4-1$, that the other sync blocks, comprised in a third one of the four second trick play segments, have second sync block sequence numbers that are equivalent to a sequence of count numbers that run from $m_0+m_1/2-m_4$ to either $m_0+3.m_1/4-(3.m_4-1)/2-1$ or to $m_0+3.m_1/4-(3.m_4+1)/2-1$, and that the other sync blocks, comprised in the fourth one of the four second trick play segments, have second sync block sequence numbers that are equivalent to a sequence of count numbers that run from either $m_0+3.m_1/4-(3.m_4-1)/2$ or from $m_0+3.m_1/4-(3.m_4+1)/2$ to $m_0+m_1-2.m_4-1$.

10. Apparatus as claimed in claim 9, characterized in that
(a) the sync blocks, comprising parity information in the first one of the four second trick play segments, have second sync block sequence numbers equivalent to the count numbers $m_0+m_1-2.m_4$ to either $m_0+m_1-(3.m_4-1)/2-1$ or to $m_0+m_1-(3.m_4+1)/2-1$,
(b) the sync blocks, comprising parity information in the second one of the four second trick play segments, have second sync block sequence numbers equivalent to the count numbers from either $m_0+m_1-(3.m_4-1)/2$ or $m_0+m_1-(3.m_4+1)/2$ to $m_0+m_1-m_4-1$,
(c) the sync blocks, comprising parity information in the third one of the four second trick play segments, have second sync block sequence numbers equivalent to the count numbers from $m_0+m_1m_4$ to either $m_0+m_1-(m_4-1)/2-1$ or $m_0+m_1-(m_4+1)/2-1$, and
(d) the sync blocks, comprising parity information in the fourth one of the four second trick play segments, have second sync block sequence numbers equivalent to the count numbers from either $m_0+m_1-(m_4-1)/2$ or $m_0+m_1-(m_4+1)/2$ to $m_0+m_1-1$.

11. Apparatus as claimed in claim 2, characterized in that $m_1=100$.

12. Apparatus as claimed in claim 1, characterized in that $n_1=4$.

13. Apparatus as claimed in claim 1, characterized in that $n_2=-4$.

14. An apparatus as claimed in claim 1, characterized in that the writing means writes a plurality of first trick play segments in each of subsequent groups of p tracks so as to enable reproduction of $m_1$ sync blocks of the first trick play signal at said trick play speed $n_1$ times the recording speed in said reproduction apparatus, during one revolution of a head drum comprised in said reproduction apparatus, the reproduction apparatus comprising at least a first and a second read head located on said head drum, said first read head having a gap with an azimuth angle substantially equal to said first azimuth angle, and the second read head having a gap with an azimuth angle substantially equal to said second azimuth angle, the writing means further writing a plurality of second trick play segments in each of said groups of p tracks so as to enable reproduction of $m_1$ sync blocks of the second trick play signal at said trick play speed $n_2$ times the recording speed, during said one revolution of the head drum, where p is an even integer value larger than 1, and where $m_1$ is an integer larger than 1, said $m_1$ sync blocks of the first trick play signal comprising $m_1/q_1$ original sync blocks of the first trick play signal and $q_1-1$ repetitions of each of the $m_1/q_1$ original sync blocks, and said $m_1$ sync blocks of the second trick play signal comprising $m_1/q_2$ original sync blocks of the second trick play signal and $q_2-1$ repetitions of each of the $m_1/q_2$ original sync blocks.

15. Apparatus as claimed in claim 14, characterized in that the second sync block sequence numbers in said $m_1/q_1$ original sync blocks of said first trick play signal are equivalent to a sequence of count numbers running from a start count number $m_0$, which is zero, to a final count number $m_0+m_1/q_1-1$, that the second sync block numbers in said $m_1/q_2$ original sync blocks of said second trick play signal are equivalent to a sequence of count numbers running from said start count number $m_0$, which is zero, to a final count number $m_0+m_1/q_2-1$, and that $q_1$ and $q_2$ are integers larger than 1 and that $m_1$ is an integer multiple of $q_1$ and $q_2$.

16. Apparatus as claimed in claim 14, characterized in that the second sync block sequence numbers of each of the $m_1/q_1$ original sync blocks of the first trick play signal are the same as the second sync block sequence numbers of their repetitions, and that the second sync block sequence numbers of each of the $m_1/q_2$ original sync blocks of the second trick play signal are also the same as the second sync block sequence numbers of their repetitions.

17. Apparatus as claimed in claim 14, characterized in that the writing means writes sync blocks of the first trick play signal into said plurality of first trick play segments in said group of p successive tracks, so as to enable reading of eight first play segments by said reproduction apparatus during said one revolution of the rotatable head drum at said trick play speed $n_1$ times the recording speed, that each one of six of the eight first trick play segments comprises $(m_1-4)/8$ sync blocks of the first trick play video signal, and that each one of the other two of the first trick play segments comprises $(m_1+12)/8$ sync blocks of the first trick play video signal.

18. Apparatus as claimed in claim 16, characterized in that the writing means writes the $m_1/q_1$ original sync blocks of the first trick play signal in such positions in the eight first trick play segments enabling, upon replay at said trick play speed $n_1$ times the recording speed, reading of the original sync blocks having second sync block sequence numbers $m_0$ to $m_0+m_1/2q_1-1$ first by said first read head of the reproduction apparatus, and reading of the original sync blocks having second sync block sequence numbers $m_0+m_1/2q_1$ to $m_0+m_1/q_1-1$ next by said second read head, during said one revolution of the head drum.

19. Apparatus as claimed in claim 18, characterized in that each one of the eight first trick play segments comprises a plurality of said original sync blocks of the first trick play signal and the $q_1-1$ repetitions of each of said plurality of original sync blocks.

20. Apparatus as claimed in claim 14, characterized in that the writing means writes sync blocks of the second trick play signal into said plurality of second trick play segments in said group of p successive tracks, so as to enable reading of nine second trick play segments by said reproduction apparatus during said one revolution of the rotatable head drum at said trick play speed $n_2$ times the recording speed, and that each one of the nine second trick play segments comprises $m_1/9$ sync blocks of the second trick play signal.

21. Apparatus as claimed in claim 20, characterized in that the i-th second trick play segment comprises original sync blocks of the second trick play signal having second sync block sequence numbers that are equivalent to a sequence of count numbers that run from $m_0+(i-1)m_1/9q_2$ to $m_0+i.m_1/9q_2-1$, where i is an integer running from 1 to 9, and that $m_1$ is an integer multiple of $9q_2$.

22. Apparatus as claimed in claim 21, characterized in that each one of the nine second trick play segments comprises one repetition of the original sync blocks of the second trick play video signal comprised in said one second trick play segment, the second sync block sequence numbers of the original sync blocks in a second trick play segment being the same as the second sync block sequence numbers of their repetitions.

23. Apparatus as claimed in claim 21, characterized in that the writing means writes said nine second trick play segments in such a position in said group of p track, enabling, during replay at said speed $n_2$ times the recording speed, reading of said first mentioned second trick play segment comprising sync blocks having second sync block sequence numbers equivalent to the count numbers $m_0$ to $m_0+m_1/9q_2-1$ first, said second, third and fourth second trick play segments thereafter by one of the two read heads of said reproduction apparatus, the fifth second trick play segment thereafter by either said one read head or the other read head, and the sixth, seventh, eighth and ninth second trick play segments read thereafter by said other one of the two read heads during said one revolution of the head drum.

24. Apparatus as claimed in claim 14, characterized in that $m_1=180$.

25. Apparatus as claimed in claim 14, characterized in that $n_1=12$.

26. Apparatus as claimed in claim 14, characterized in that $n_2=-12$.

27. Apparatus as claimed in claim 14, characterized in that $q_1=2$.

28. Apparatus as claimed in claim 14, characterized in that $q_2=2$.

29. Apparatus as claimed in claim 14, characterized in that the writing means writes sync blocks of the first trick play signal into said plurality of first trick play segments in said group of p successive tracks, so as to enable reading of 18 first play segments during said one revolution of the rotatable head drum of the reproduction apparatus at said trick play speed $n_1$ times the recording speed, and that each of the 18 first trick play segments comprises $m_1/18$ sync blocks of the first trick play signal.

30. Apparatus as claimed in claim 29, characterized in that the i-th first trick play segment comprises original sync blocks of the first trick play signal having second sync block sequence numbers that are equivalent to a sequence of count numbers that run from $m_0+(i-1)m_1/18q_1$ to $m_0+i.m_1/18q_1-1$, where i is an integer running from 1 to 18, and that $m_1$ is an integer multiple of $18q_1$.

31. Apparatus as claimed in claim 30, characterized in that each one of the 18 first trick play segments comprises twice a repetition of the original sync blocks of the first trick play signal comprised in said one first trick play segment, the second sync block sequence numbers of the original sync blocks in a first trick play segment being the same as the second sync block sequence numbers of their repetitions.

32. Apparatus as claimed in claim 14, characterized in that the writing means writes sync blocks of the second trick play signal into said plurality of second trick play segments in said group of p successive tracks, so as to enable reading of 18 second play segments during said one revolution of the rotatable head drum of the reproduction apparatus at said trick play speed $n_2$ times the recording speed, and that each one of the 18 second trick play segments comprises $m_1/18$ sync blocks of the second trick play signal.

33. Apparatus as claimed in claim 32, characterized in that the i-th second trick play segment comprises original sync blocks having second sync block sequence numbers that are equivalent to a sequence of count numbers that run from $m_0+(i-1)m_1/18q_2$ to $m_0+i.m_1/18q_2-1$, where i is an integer running from 1 to 18, and that $m_1$ is an integer multiple of $18q_2$.

34. Apparatus as claimed in claim 33, characterized in that each one of the 18 second trick play segments comprises twice a repetition of the original sync blocks of the second trick play signal comprised in said one second trick play segment, the second sync block sequence numbers of the original sync blocks in a second trick play segment being the same as the second sync block sequence numbers of their repetitions.

35. Apparatus as claimed in claim 29, characterized in that $m_1=270$.

36. Apparatus as claimed in claim 29, characterized in that $n_1=24$.

37. Apparatus as claimed in claim 29, characterized in that $n_2=-24$.

38. Apparatus as claimed in claim 29, characterized in that $q_1=q_2=3$.

39. Apparatus as claimed in claim 1, characterized in that the trick play sync blocks comprise a synchronization word portion, an identifier portion, a header portion and a data portion, the second sync block sequence number being stored in the header portion.

40. Apparatus as claimed in claim 39, characterized in that the header portion comprises at least two bytes and that the second sync block sequence number is stored in the second byte of the header portion.

41. Apparatus as claimed in claim 40, characterized in that the second sync block sequence number is a 6-bit word stored in the 6 least significant bits of the second byte of the header portion.

42. Apparatus as claimed in claim 41, characterized in that $m_1=90$, that the second sync block sequence number equals the count number, if the count number is smaller than a first integer constant which is smaller than 64, and the sync block is included in a trick play segment that is written by the first write head, and that otherwise the second sync block sequence number equals the count number minus a second integer constant.

43. Apparatus as claimed in claim 42, characterized in that for the second integer constant, the relation holds: $36 \leq$ second integer constant $\leq 90$ minus the first integer constant.

44. Apparatus as claimed in claim 42, characterized in that the first integer constant equals 50 and the second integer constant equals 40.

45. An apparatus for recording a first digital information signal in slant tracks on a magnetic record carrier, the apparatus comprising:
input means for receiving the first digital information signal;
signal processing means for processing the first digital signal into a first trick play signal, suitable for recording in the slant tracks; and
writing means for writing, at a recording speed of the record carrier, the first trick play signal to form first trick play segments located at specific positions in said tracks, the writing means comprising at least a first and a second write head located on a rotatable head drum, the first write head having a gap with a first azimuth angle, and the second write head having a gap with a second azimuth angle which is different from the first azimuth angle, the first digital information signal enabling replay in a reproduction apparatus at a trick play reproduction speed which equals $n_1$ times the recording speed, where $n_1$ is an integer unequal to 0 and 1, characterized in that the first trick play signal comprises sync blocks of information of the first digital information signal, and that the writing means writes the sync blocks of the first trick play signal into a plurality of the first trick play segments in a group of p successive tracks, the sync blocks in the trick play segments comprising a first and a second sync block sequence number, the first sync block sequence number in a sync block having a relationship with the position of the sync block in a slant track, and the second sync block sequence number having no such relationship with the position of the sync block in said slant track.

46. Apparatus as claimed in claim 45, characterized in that the writing means writes a plurality of first trick play segments in each of subsequent groups of p tracks enabling reproduction of $m_1$ sync blocks of the first trick play signal at said trick play speed $n_1$ times the recording speed in said reproduction apparatus, during one revolution of a head drum comprised in said reproduction apparatus, the reproduction apparatus comprising at least a first and a second read head located on said head drum, said first read head having a gap with an azimuth angle substantially equal to said first azimuth angle, and the second read head having a gap with an azimuth angle substantially equal to said second azimuth angle, where p is an even integer value larger than 1, and where $m_1$ is an integer larger than 1, and that the second sync block sequence numbers in said $m_1$ sync blocks of the first trick play signal are equivalent to a sequence of count numbers running from a start count number $m_0$, which is preferably zero, to a final count number $m_0+m_1-1$.

47. Apparatus as claimed in claim 45, characterized in that the writing means writes a plurality of first trick play segments in each of subsequent groups of p tracks enabling reproduction of $m_1$ sync blocks of the first trick play signal at said trick play speed $n_1$ times the recording speed in said reproduction apparatus, during one revolution of a head drum comprised in said reproduction apparatus, the reproduction apparatus comprising at least a first and a second read head located on said head drum, said first read head having a gap with an azimuth angle substantially equal to said first azimuth angle, and the second read head having a gap with an azimuth angle substantially equal to said second azimuth angle, where p is an even integer value larger than 1, and where $m_1$ is an integer larger than 1, and that said $m_1$ sync blocks of the first trick play signal comprise $m_1q_1$ original sync blocks of the first trick play signal and $q_1-1$ repetitions of each of the $m_1/q_1$ original sync blocks.

48. Method of recording a first digital information signal in slant tracks on a magnetic record carrier, the method comprising the steps:
receiving the first digital information signal;
processing the first digital signal into a first trick play signal, suitable for recording in the slant tracks; and
writing, at a recording speed of the record carrier, the first trick play signal to form first trick play segments located at specific positions in said slant tracks using writing means comprising at least a first and a second write head located on a rotatable head drum, the first write head having a gap with a first azimuth angle, and the second write head having a gap with a second azimuth angle which is different from the first azimuth angle, the first digital information signal enabling replay in a reproduction apparatus at a trick play reproduction speed which equals $n_1$ times the recording speed, where $n_1$ is an integer unequal to 0 and 1, characterized in that the processing step comprises generating the first trick play signal comprising sync blocks of information of the first digital information signal, and that the sync blocks of the first trick play signal are written into a plurality of the first trick play segments in a group of p successive tracks, the sync blocks in the trick play segments comprising a first and a second sync block sequence number, the first sync block sequence number is a sync block having a relationship with the position of the sync block in a track, and the second sync block sequence number having no such relationship with the position of the sync block in said track.

* * * * *